United States Patent [19]
Suzuki et al.

[11] Patent Number: 6,121,445
[45] Date of Patent: Sep. 19, 2000

[54] 1,3,5-TRIAZINE DERIVATIVE SALTS OF POLYACIDS COMPRISING PHOSPHORUS, SULFUR, AND OXYGEN AND PROCESS FOR PRODUCING THE SAME

[75] Inventors: Keitaro Suzuki, Chiba; Masuo Shindo, Toyama; Motoko Iijima, Chiba, all of Japan

[73] Assignee: Nissan Chemical Industries, Ltd., Tokyo, Japan

[21] Appl. No.: 09/367,868

[22] PCT Filed: Feb. 26, 1998

[86] PCT No.: PCT/JP98/00778

§ 371 Date: Sep. 3, 1999

§ 102(e) Date: Sep. 3, 1999

[87] PCT Pub. No.: WO98/39307

PCT Pub. Date: Nov. 9, 1998

[30] Foreign Application Priority Data

Mar. 4, 1997 [JP] Japan ..................... 9-049211

[51] Int. Cl.[7] ............... C07D 251/54; C07D 251/66
[52] U.S. Cl. .................. 544/195; 544/196; 544/197
[58] Field of Search .................... 544/196, 197, 544/195

[56] References Cited

FOREIGN PATENT DOCUMENTS

| 286 478 | 10/1988 | European Pat. Off. . |
| 40-28594 | 12/1965 | Japan . |
| 61-126091 | 6/1986 | Japan . |
| 08231517 | 9/1996 | Japan . |
| 96/09344 | 3/1996 | WIPO . |
| 96/17013 | 6/1996 | WIPO . |
| 97/31056 | 8/1997 | WIPO . |

*Primary Examiner*—Mukund J. Shah
*Assistant Examiner*—V Balasubramanian
*Attorney, Agent, or Firm*—Oblon, Spivak, McClelland, Maier & Neustadt, P.C.

[57] ABSTRACT

A 1,3,5-triazine derivative salt of a polyacid comprising phosphorus, sulfur and oxygen, which has a solubility of from 0.01 to 0.10 g/100 ml in water (25° C.) and a pH of from 2.0 to 7.0 as a 10 wt % aqueous slurry (25° C.), and which is obtained from the following steps (a) and (b):

(a) a step of obtaining a reaction product by mixing melamine, phosphoric acid and sulfuric acid at a temperature of from 0 to 330° C. in such ratios that the melamine is from 1.0 to 4.0 mols per mol of the total molar amount of the phosphoric acid (as calculated as orthophosphoric acid content) and the sulfuric acid (as sulfuric acid content), and the sulfuric acid (as sulfuric acid content) is from 0.05 to 20 mols per mol of the phosphoric acid (as calculated as orthophosphoric acid content), and (b) a step of baking the reaction product obtained in step (a) at a temperature of from 340 to 400° C. for from 0.1 to 30 hours; and a process for its production.

14 Claims, No Drawings

1,3,5-TRIAZINE DERIVATIVE SALTS OF POLYACIDS COMPRISING PHOSPHORUS, SULFUR, AND OXYGEN AND PROCESS FOR PRODUCING THE SAME

TECHNICAL FIELD

The present invention relates to a 1,3,5-triazine derivative salt of a polyacid comprising phosphorus, sulfur and oxygen, and a process for its production.

BACKGROUND ART

With respect to baked products of melamine and phosphoric acid, melamine orthophosphate, melamine pyrophosphate and melamine polyphosphate have, for example, been known, and there have been many reports on processes for their production. JP-A-61-126091 discloses a process for producing melamine condensed phosphate which comprises reacting condensed phosphoric acid and melamine in a solid phase substantially in the absence of an aqueous medium under a temperature condition of from naturally generated heat temperature to 170° C.

It is known to employ urea as a condensation agent in the production of a polyphosphate. For example, JP-B-53-2170 discloses a process for producing a polyphosphoric acid amide (amide polyphosphate) containing amide-type nitrogen, which is obtainable by using ammonium orthophosphate, orthophosphoric acid, condensed phosphoric acid, phosphoric anhydride, urea phosphate, or a mixture thereof, as a phosphoric acid source, and a cyanamide compound such as melamine, dicyan cyanamide, guanidine or guanyl urea, as a nitrogen source, and subjecting a mixture thereof to a heat condensation reaction in the presence of urea, urea phosphate or a mixture thereof, as a condensation agent. As the production conditions, it is disclosed to carry out the heat condensation in a ratio of urea/phosphoric acid (as $H_3PO_4$)/cyanamide compound= 0.8–1.5/1/0.05–1 (molar ratio) in an ammonia gas atmosphere at a temperature of from 150 to 350° C. for from 10 minutes to 5 hours, preferably from 1 to 4 hours.

A.C.S. Symposium Series No. 425 "Fire and Polymers", chapter 15, p. 211–238, American Chemical Society, Washington, D.C., 1990, discloses that melam ultraphosphate is formed by heating melamine phosphate [melamine/phosphorus atom=1/1 (molar ratio)] at a temperature of from 330 to 410° C.

JP-A-8-231517 discloses a process for producing a melamine sulfate composition characterized by reacting sulfuric acid and melamine in a molar ratio of 1:0.1 to 1, as an aminotriazine sulfate composition having water resistance.

With respect to a baked product of melamine and sulfuric acid, the above-mentioned A.C.S. Symposium Series No. 425 "Fire and Polymers", chapter 15, p. 211–238, American Chemical Society, Washington, D.C., 1990, discloses melamine sulfate [melamine/sulfur atom=1/1 (molar ratio)] and that dimelam pyrosulfate will be formed by heating it at a temperature of from 300 to 400.

There has been no report on a baked product comprising three components of melamine, phosphoric acid and sulfuric acid.

Many proposals have been made up to present with respect to utilization of melamine phosphate as a flame retardant. For example, JP-A-53-49054 discloses a polyamide resin composition having the flame retardancy improved by adding an inorganic filler and melamine phosphate to a polyamide.

JP-A-61-126091 discloses that melamine condensed phosphate is effective as a flame retardant for a thermoplastic resin such as a polyester, a polyamide or a polyolefin, a thermosetting resin such as phenol or urethane epoxy, or a cellulose material.

With respect to utilization of melamine sulfate as a flame retardant, JP-A-54-47750 discloses that melamine sulfate [melamine/sulfur atom=2/1 (molar ratio)] is used as a flame retardant for polyamide.

The melamine polyphosphate or the melamine condensed phosphate as disclosed in the above-mentioned prior art can hardly be used effectively as a flame retardant for a resin having a high molding temperature, since desorption of melamine is substantial when heated at a temperature of at least 300° C. Further, the above-mentioned melamine sulfate can hardly be used effectively as a flame retardant for a resin having a high molding temperature, since it produces ammonium hydrogensulfate when heated at a temperature of at least 300° C.

The present invention is to overcome the drawbacks of the above-mentioned prior art and to present a 1,3,5-triazine derivative salt of a polyacid comprising phosphorus, sulfur and oxygen, which is useful for a wide range of applications as a flame retardant and which is produced from melamine, phosphoric acid and sulfuric acid as starting materials, and a process for its production.

DISCLOSURE OF THE INVENTION

The process for producing a 1,3,5-triazine derivative salt of a polyacid comprising phosphorus, sulfur and oxygen, according to the present invention, will be described.

The process for producing a 1,3,5-triazine derivative salt of a polyacid comprising phosphorus, sulfur and oxygen, which has solubility of from 0.01 to 0.10 g/100 ml in water (25° C.) and a pH of from 2.0 to 7.0 as a 10 wt % aqueous slurry (25° C.), according to the present invention, comprises the following steps (a) and (b):

(a) a step of obtaining a reaction product by mixing melamine, phosphoric acid and sulfuric acid at a temperature of from 0 to 330° C. in such ratios that the melamine is from 1.0 to 4.0 mols per mol of the total molar amount of the phosphoric acid (as calculated as orthophosphoric acid content) and the sulfuric acid (as sulfuric acid content), and the sulfuric acid (as sulfuric acid content) is from 0.05 to 20 mols per mol of the phosphoric acid (as calculated as orthophosphoric acid content), and (b) a step of baking the reaction product obtained in step (a) at a temperature of from 340 to 400° C. for from 0.1 to 30 hours.

And, the invention will be described specifically by the five embodiments.

The first embodiment of the present invention is a process for producing a melamine-melam-melem double salt of a polyacid comprising phosphorus, sulfur and oxygen, which has a solubility of from 0.01 to 0.10 g/100 ml in water (250° C.), a pH of from 2.5 to 4.5 as a 10 wt % aqueous slurry (250° C.), a sulfur atom content of 1 mol per mol of the phosphorus atom, and characteristic X-ray diffraction peaks at $2\theta$ (±0.2°) of 6.1°, 10.3°, 19.0° and 28.6° in the powder X-ray diffraction (anticathode: Cu-K$\alpha$), which process comprises the following steps (a) and (b):

(a) a step of obtaining a reaction product by mixing melamine, phosphoric acid and sulfuric acid at a temperature of from 0 to 330° C. in such ratios that the melamine is from 2.0 to 4.0 mols per mol of the total molar amount of the phosphoric acid (as calculated as orthophosphoric acid content) and the sulfuric acid (as sulfuric acid content), and the sulfuric acid (as sulfuric acid content) is 1 mol per mol of the phosphoric acid (as calculated as orthophosphoric acid content), and (b) a step of baking the reaction product obtained in step (a) at a temperature of from 340 to 400° C. for from 0.1 to 30 hours.

The second embodiment of the present invention is a process for producing a 1,3,5-triazine derivative salt mixture comprising a melamine-melam-melem double salt of a polyphosphoric acid and a melamine-melam-melem double salt of a polyacid comprising phosphorus, sulfur and oxygen, which has a solubility of from 0.01 to 0.10 g/100 ml in water (250° C.), a pH of from 2.5 to 7.0 as a 10 wt % aqueous slurry (250° C.), and characteristic X-ray diffraction peaks at 2θ (±0.20) of 6.1°, 8.2°, 10.3°, 14.8°, 18.2°, 19.0°, 26.7° and 28.6° in the powder X-ray diffraction (anticathode: Cu-Kα), which process comprises the following steps (a) and (b):

(a) a step of obtaining a reaction product by mixing melamine, phosphoric acid and sulfuric acid at a temperature of from 0 to 330° C. in such ratios that the melamine is from 2.0 to 4.0 mols per mol of the total molar amount of the phosphoric acid (as calculated as orthophosphoric acid content) and the sulfuric acid (as sulfuric acid content), and the sulfuric acid (as sulfuric acid content) is from 0.05 to 0.9 mol per mol of the phosphoric acid (as calculated as orthophosphoric acid content), and (b) a step of baking the reaction product obtained in step (a) at a temperature of from 340 to 400° C. for from 0.1 to 30 hours.

The third embodiment of the present invention is a process for producing a 1,3,5-triazine derivative salt mixture comprising dimelam pyrosulfate and a melamine•melam•melem double salt of a polyacid comprising phosphorus, sulfur and oxygen, which has a solubility of from 0.01 to 0.10 g/100 ml in water (25° C.), a pH of from 2.5 to 4.5 as a 10 wt % aqueous slurry (25° C.), and characteristic X-ray diffraction peaks at 2θ (±0.2°) of 6.1°, 10.3°, 10.6°, 19.0°, 19.5°, 21.3°, 27.3° and 28.6° in the powder X-ray diffraction (anticathode: Cu-Kα), which process comprises the following steps (a) and (b):

(a) a step of obtaining a reaction product by mixing melamine, phosphoric acid and sulfuric acid at a temperature of from 0 to 330° C. in such ratios that the melamine is from 2.0 to 4.0 mols per mol of the total molar amount of the phosphoric acid (as calculated as orthophosphoric acid content) and the sulfuric acid (as sulfuric acid content), and the sulfuric acid (as sulfuric acid content) is from 1.1 to 20 mol per mol of the phosphoric acid (as calculated as orthophosphoric acid content), and (b) a step of baking the reaction product obtained in step (a) at a temperature of from 340 to 400° C. for from 0.1 to 30 hours.

The fourth embodiment of the present invention is a process for producing a melamine•melam•melem double salt of a polyacid comprising phosphorus, sulfur and oxygen, which has a solubility of from 0.01 to 0.10 g/100 ml in water (25° C.), a pH of from 2.5 to 4.5 as a 10 wt % aqueous slurry (25° C.), and a dimelam pyrosulfate structure represented by characteristic X-ray diffraction peaks at 2θ (±0.2°) of 10.6°, 19.5°, 21.3° and 27.3° in the powder X-ray diffraction (anticathode: Cu-Kα), which process comprises the following steps (a) and (b):

(a) a step of obtaining a reaction product by mixing melamine, phosphoric acid and sulfuric acid at a temperature of from 0 to 330° C. in such ratios that the melamine is from 1.0 to 1.9 mols per mol of the total molar amount of the phosphoric acid (as calculated as orthophosphoric acid content) and the sulfuric acid (as sulfuric acid content), and the sulfuric acid (as sulfuric acid content) is from 1.0 to 20 mol per mol of the phosphoric acid (as calculated as orthophosphoric acid content), and (b) a step of baking the reaction product obtained in step (a) at a temperature of from 340 to 400° C. for from 0.1 to 30 hours.

The fifth embodiment of the present invention is a process for producing a 1,3,5-triazine derivative salt mixture comprising dimelam pyrosulfate and a melamine polyphosphate•melam•melem double salt, which has a solubility of from 0.01 to 0.10 g/100 ml in water (25° C.), pH of from 2.0 to 7.0 as a 10 wt % aqueous slurry (25° C.), which comprises the following steps (a) and (b):

(a) a step of obtaining a reaction product by mixing melamine, phosphoric acid and sulfuric acid at a temperature of from 0 to 330° C. in such ratios that the melamine is from 1.0 to 1.9 mols per mol of the total molar amount of the phosphoric acid (as calculated as orthophosphoric acid content) and the sulfuric acid (as sulfuric acid content), and the sulfuric acid (as sulfuric acid content) is from 0.05 to 0.9 mol per mol of the phosphoric acid (as calculated as orthophosphoric acid content), and (b) a step of baking the reaction product obtained in step (a) at a temperature of from 340 to 400° C. for from 0.1 to 30 hours.

And, in step (a) in the process of the present invention, the phosphoric acid is preferably an aqueous orthophosphoric acid solution having an orthophosphoric acid concentration of at least 50 wt %, and the sulfuric acid is preferably an aqueous sulfuric acid solution having a sulfuric acid concentration of at least 50 wt %.

Here, the melamine•melam•melem double salt of a polyacid comprising phosphorus, sulfur and oxygen, according to the present invention, will be described as follows.

The polyacid comprising phosphor, sulfur and oxygen is a polyacid formed from phosphorus, sulfur and oxygen, having a phosphite sulfate group of the formula (1):

(wherein O represents an oxygen atom, H represents a hydrogen atom, P represents a phosphorus atom, and S represents a sulfur atom), a mixture of a polyphosphoric acid and a polyacid formed from phosphorus, sulfur and oxygen, having a phosphite sulfate group, a mixture of pyrosulfuric acid and a polyacid formed from phosphorus, sulfur and oxygen, having a phosphite sulfate group, a mixture of a polyphosphoric acid, a pyrosulfuric acid and a polyacid formed from phosphorus, sulfur and oxygen, having a phosphite sulfate group, or a mixture of a polyphosphoric acid and pyrosulfuric acid. The melamine•melam•melem double salt of a polyacid comprising phosphorus, sulfur and oxygen, is a crystalline double salt comprising the above polyacid, and melamine, melam and melem as base components. Next, the melamine•melam•melem double salt of a polyphosphoric acid is a melamine•melam•melem double salt of a chain polyphosphoric acid or a melamine•melam•melem double salt of metaphosphoric acid, of the general formula (2):

$$\alpha(MmH)_2O \cdot \beta(MdH)_2O \cdot \gamma(MpH)_2O \cdot \delta P_2O_5 \quad (2)$$

(wherein Mm represents melamine, Md represents melam, Mp represents melem, H represents a hydrogen atom, P represents a phosphorus atom, O represents an oxygen atom, and α, β, γ and 67 represent positive numbers, having an interrelation of $1 \leq (\alpha+\beta+\gamma)/\delta < 2$).

Further, the dimelam pyrosulfate is a melam salt of pyrosulfuric acid (disulfuric acid) of the formula (3):

$$(MdH)_2S_2O_7 \quad (3)$$

(wherein Md represents melam, H represents a hydrogen tom, S represents a sulfur atom, and O represents an oxygen atom).

Here, melamine, melam and melem are 1,3,5-triazine derivatives.

The melamine (Mm) is 2,4,6-triamino-1,3,5-triazine of the formula (4):

$$C_3H6N_6 \quad (4).$$

The melam (Md) is (N-4,6-diamino-1,3,5-triazin-2-yl)-1, 3,5-triazine-2,4,6-triamine of the formula (5):

$$C_6H_9N_{11} \quad (5).$$

This is a 1,3,5-triazine derivative having two molecules of melamine condensed to have one molecule of ammonia desorbed therefrom.

The melem (Mp) is 2,5,8-triamino-1,3,4,6,7,9,9b-heptaazaphenalene of the formula (6):

$$C_6H_6N_{10} \quad (6).$$

This is a 1,3,5-triazine derivative having two molecules of melamine condensed to have two molecules of ammonia desorbed therefrom.

BRIEF DESCRIPTION OF THE DRAWINGS

In FIGS. 1, 3,5,7 and 9, symbol 1 indicates a curve showing the results of the differential thermal analysis (DTA), symbol 2 indicates a curve showing the results of the thermogravimetric analysis (TG), and symbol 3 indicates a curve showing the results of the time (minutes) and the temperature (° C.).

BEST MODE FOR CARRYING OUT THE INVENTION

Figure 1:
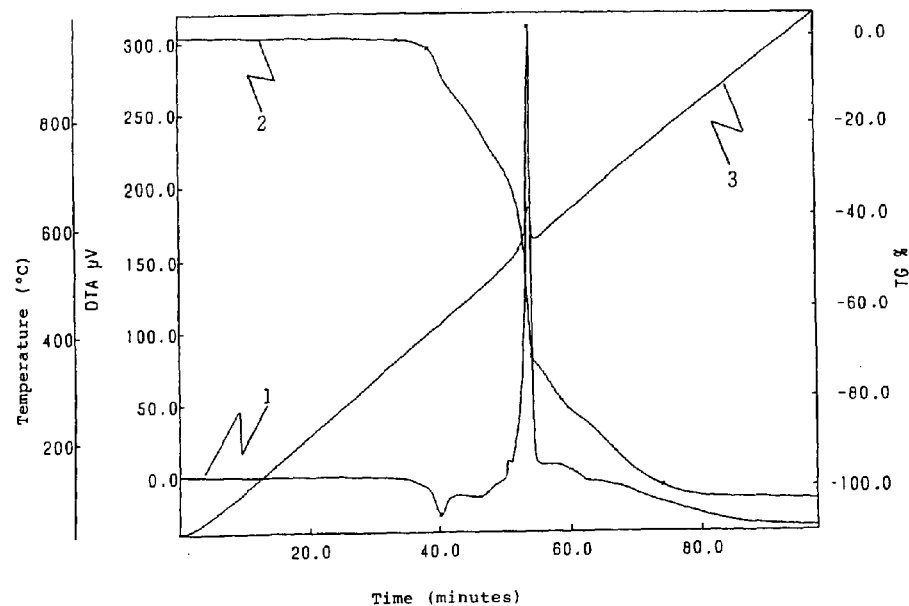
FIG. 1 is a graph of the differential thermal analysis of the melamine•melam•melem double salt of a polyphosphoric acid obtained in Reference Example 1.
Figure 2:
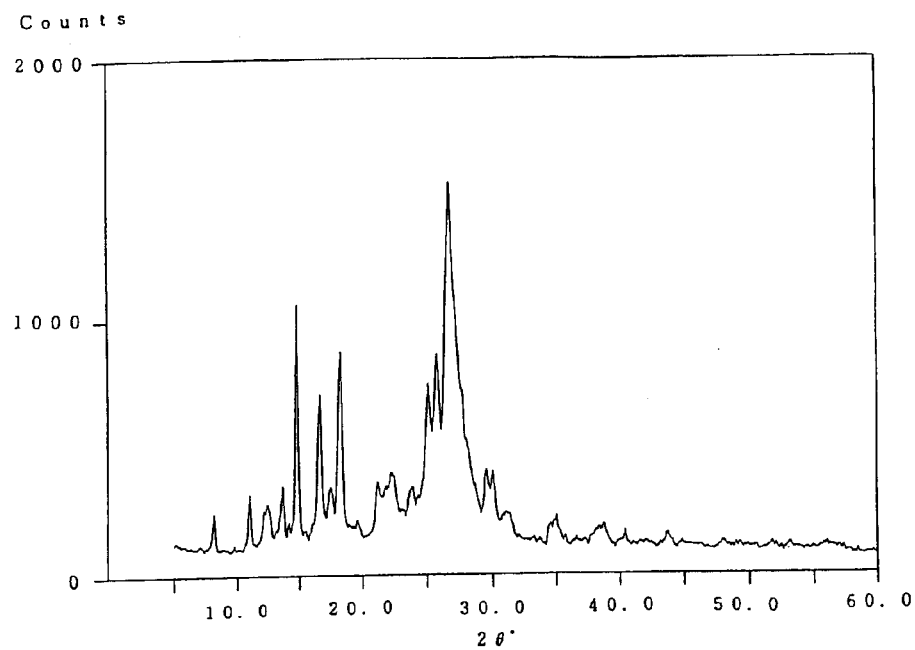
FIG. 2 is a powder X-ray diffraction pattern of the melamine•melam•melem double salt of a polyphosphoric acid obtained in Reference Example 1.

The melamine, the sulfuric acid, the phosphoric acid, etc., to be used in step (a) of the present invention may be those which are commercially available.

As the phosphoric acid, orthophosphoric acid, pyrophosphoric acid or polyphosphoric acid may, for example, be used, but orthophosphoric acid is preferred. For an aqueous orthophosphoric acid solution, one made by either a thermal process or a wet process may be used as a solution having an orthophosphoric acid concentration of at least 50 wt %. However, the higher the orthophosphoric acid concentration, the better, and particularly preferred is a thermal process orthophosphoric acid aqueous solution having an orthophosphoric acid concentration of from 75 to 89 wt %. An aqueous orthophosphoric acid solution having an orthophosphoric acid concentration of less than 50 wt % is not desirable, since water is so much that, after mixing for reaction, it takes time for drying.

As the sulfuric acid, one having a sulfuric acid concentration of at least 50 wt %, can be used, but the higher the sulfuric acid concentration, the better, and a commercially available concentrated sulfuric acid (95%) can be used as diluted with water. An aqueous sulfuric acid solution having a sulfuric acid concentration of less than 50 wt % can also be used, but such is not preferred, since water is so much that, after the mixing for reaction, it takes time for drying.

Further, in the present invention, instead of the phosphoric acid, an aqueous solution of ammonium monohydrogen phosphate may be employed, and an aqueous solution having ammonium phosphate added to an aqueous phosphoric acid solution, may also be employed. Further, instead of the sulfuric acid, an aqueous solution of ammonium dihydrogensulfate may be employed, and an aqueous solution having ammonium sulfate added to an aqueous sulfuric acid solution, may also be employed.

In the present invention, at the time of reacting melamine with phosphoric acid and sulfuric acid for reaction, a mixed aqueous solution of phosphoric acid and sulfuric acid may preliminarily be prepared and used. At that time, instead of the mixed aqueous solution of phosphoric acid and sulfuric acid, an aqueous solution having ammonium monohydrogen phosphate, ammonium dihydrogen phosphate or ammonium phosphate added to an aqueous sulfuric acid solution, may be used, and an aqueous solution having ammonium hydrogensulfate or ammonium sulfate added to an aqueous phosphoric acid solution, may also be used.

In the present invention, for mixing melamine with phosphoric acid and sulfuric acid for reaction, it is possible to employ a mixing or stirring apparatus such as an automatic mortar, a universal mixer, a Henschel mixer or a homogenizer.

Remarkable heat generation takes place by the mixing of melamine with phosphoric acid and sulfuric acid according to the present invention. Accordingly, in a case where the concentrations of phosphoric acid and sulfuric acid used, are high, the reaction product will be obtained in the form of a wet or dry powder due to evaporation of water during the mixing. To carry out the reaction uniformly, the mixing or stirring apparatus is preferably a Henschel mixer having a shearing force.

In the present invention, at the time of mixing melamine with phosphoric acid and sulfuric acid, it is possible to obtain a desired 1,3,5-triazine derivative salt of a polyacid comprising phosphorus, sulfur and oxygen, by selecting the molar ratio of the melamine per mol of the total molar amount of the phosphoric acid (as calculated as orthophosphoric acid content) and the sulfuric acid (as sulfuric acid content), and the molar ratio of the sulfuric acid (as sulfuric acid content) per mol of the phosphoric acid (as calculated as orthophosphoric acid content).

Here, if the ratio of the melamine is less than 1.0 mol per mol of the total molar amount of the phosphoric acid (as calculated as orthophosphoric acid content) and the sulfuric acid (as sulfuric acid content), the acid in the baked product tends to be excessive, and the acidity tends to be too strong, such being undesirable. On the other hand, if the ratio of the melamine exceeds 4.0 mols per mol of the total molar amount of the phosphoric acid and the sulfuric acid, the amount of melamine remaining in the final baked product tends to be too much, or volatilization of melamine during the baking tends to be too much, such being undesirable.

And, if the melamine is from 2.0 to 4.0 mols per mol of the total molar amount of the phosphoric acid (as calculated orthophosphoric acid content) and the sulfuric acid (as sulfuric acid content), and the sulfuric acid (as sulfuric acid content) is 1 mol per mol of the phosphoric acid (as calculated as orthophosphoric acid content), the baked product obtained in step (b) will be a melamine•melam•melem double salt of a polyacid comprising phosphorus, sulfur and oxygen, which has a solubility of from 0.01 to 0.10 g/100 ml in water ($25°$ C.), a pH of from 2.5 to 4.5 as a 10 wt % aqueous slurry ($25°$ C.), a sulfur atom content of 1 mol per mol of the phosphorus atom, and characteristic X-ray diffraction peaks at 2θ (±0.2°) of 6.1°, 10.3°, 19.0° and 28.6° in the powder X-ray diffraction (anticathode: Cu-Kα).

If the melamine is from 2.0 to 4.0 mols per mol of the total molar amount of the phosphoric acid (as calculated as orthophosphoric acid content) and the sulfuric acid (as sulfuric acid content), and the sulfuric acid (as sulfuric acid content) is from 0.05 to 0.9 mol per mol of the phosphoric acid (as calculated as orthophosphoric acid content), the baked product obtained in step (b) will be a 1,3,5-triazine derivative salt mixture comprising a melamine•melam•melem double salt of a polyphosphoric acid and a melamine•melam•melem double salt of a polyacid comprising phosphorus, sulfur and oxygen, which has a solubility of from 0.01 to 0.10 g/100 ml in water ($25°$ C.), a pH of from 2.5 to 7.0 as a 10 wt % aqueous slurry ($250°$ C.), and characteristic X-ray diffraction peaks at 2θ (±0.2°) of 6.1°, 8.2°, 10.3°, 14.8°, 18.2°, 19.0°, 26.7° and 28.6° in the powder X-ray diffraction (anticathode: Cu-Kα).

If the melamine is from 2.0 to 4.0 mols per mol of the total molar amount of the phosphoric acid (as calculated as orthophosphoric acid content) and the sulfuric acid (as sulfuric acid content), and the sulfuric acid (as sulfuric acid content) is from 1.1 to 2.0 mols per mol of the phosphoric acid (as calculated as orthophosphoric acid content), the baked product obtained in step (b) will be a 1,3,5-triazine derivative salt mixture comprising dimelam pyrosulfate and a melamine•melam•melem double salt of a polyacid comprising phosphorus, sulfur and oxygen, which has a solubility of from 0.01 to 0.10 g/100 ml in water ($25°$ C.), a pH of from 2.5 to 4.5 as a 10 wt % aqueous slurry ($25°$ C.), and characteristic X-ray diffraction peaks at 2θ (±0.2°) of 6.1°, 10.3°, 10.6°, 19.0°, 19.5°, 21.3°, 27.3° and 28.6° in the powder X-ray diffraction (anticathode: Cu-Kα).

If the melamine is from 1.0 to 1.9 mols per mol of the total molar amount of the phosphoric acid (as calculated as orthophosphoric acid content) and the sulfuric acid (as sulfuric acid content), and the sulfuric acid (as sulfuric acid content) is from 1.0 to 20 mols per mol of the phosphoric acid (as calculated as orthophosphoric acid content), the baked product obtained in step (b) will be a melamine•melam•melem double salt of a polyacid comprising phosphorus, sulfur and oxygen, which has a solubility of from 0.01 to 0.10 g/100 ml in water ($25°$ C.), a pH of from 2.5 to 4.5 as a 10 wt % aqueous slurry ($25°$ C.), and a dimelam pyrosulfate structure represented by characteristic X-ray diffraction peaks at 2θ (±0.2°) of 10.6°, 19.5°, 21.3° and 27.3° in the powder X-ray diffraction (anticathode: Cu-Kα).

If the melamine is from 1.0 to 1.9 mols per mol of the total molar amount of the phosphoric acid (as calculated as orthophosphoric acid content) and the sulfuric acid (as sulfuric acid content), and the sulfuric acid (as sulfuric acid content) is from 0.05 to 0.9 mol per mol of the phosphoric acid (as calculated as orthophosphoric acid content), the baked product obtained in step (b) will be a 1,3,5-triazine derivative salt mixture comprising dimelam pyrosulfate and a melamine•melam•melem double salt of a polyphosphoric acid, which has a solubility of from 0.01 to 0.10 g/100 ml in water ($250°$ C.), a pH of from 2.0 to 7.0 as a 10 wt % aqueous slurry ($250°$ C.).

In the present invention, the temperature for mixing and stirring the melamine with the phosphoric acid and the sulfuric acid may be from 0 to 330° C., but it is preferably from 80 to 150° C. in order to efficiently carry out removal of water or to suppress volatilization of the melamine. The total time for mixing and stirring may usually be from 10 minutes to 2 hours, although it may depend also on the intensity of mixing. The phosphoric acid and the sulfuric acid may preliminarily be mixed in the predetermined ratios and added after adjusting their concentrations with water, or phosphoric acid and sulfuric acid having their concentrations respectively adjusted with water, may separately be added.

By the mixing of melamine with phosphoric acid and sulfuric acid according to the present invention, the melamine is reacted with phosphoric acid and sulfuric acid to form a double salt reaction product comprising melamine phosphate, melamine sulfate and/or melamine sulfate phosphate (each being a hydrous salt).

In the mixing of melamine with phosphoric acid and sulfuric acid according to the present invention, it has been surprisingly found that deposition of the reaction product on the apparatus is very little, and it can be said that addition of sulfuric acid is effective, since in the reaction of melamine with phosphoric acid, deposition on the apparatus is substantial. In the present invention, if required, for the purpose of preventing deposition, a colloidal silica powder may be added at the time of the mixing.

As the colloidal silica powder, one having a primary particle size of at most 100 nm, such as precipitated silica powder or pyrogenic silica powder, is preferred. And, one having a primary particle size of from 8 to 50 nm is more preferred, since it is readily available.

In the present invention, the reaction product obtained by mixing melamine with phosphoric acid and sulfuric acid, is baked at a temperature of from 340 to 400° C., preferably from 340 to 380° C., for from 0.1 to 30 hours, to obtain the desired baked product.

In step (b) in the present invention, the reaction product is dehydrated to be anhydrous, and at the same time, the melamine in the form of a phosphate becomes to be a melamine•melam•melem composite as a result of desorption of an ammonia molecule from a part of the melamine, and the melamine in the form of a sulfate becomes to be melam as a result of desorption of an ammonia molecule therefrom. And, the phosphoric acid and the sulfuric acid will undergo condensation to form a melamine•melam•melem double salt of a polyacid comprising phosphorus, sulfur and oxygen, dimelam pyrosulfate or a melamine•melam•melem double salt of a polyphosphoric acid, or a mixture thereof.

With respect to the melamine•melam•melem double salts of polyacids comprising phosphor, sulfur and oxygen, having dimelam pyrosulfate structures, obtained in Examples 1 and 2, and the compound having a structure of a melamine•melam•melem double salt of a polyacid comprising phosphorus, sulfur and oxygen [carbon atom/phosphorus atom/sulfur atom=14/1/1 (molar ratio)] obtained in Example 3, the detailed structures are not clearly understood, but as a result of the differential thermal analysis, each compound is clearly different from the thermal decomposition behavior of a melamine salt such as melamine polyphosphate. It is considered that by the heating, a melamine•melam double salt, a melam salt and a melamine•melam•melem double salt have formed from the melamine salt.

If the baking temperature is less than 340° C., formation of e.g. a melamine•melam double salt, a melam salt, and a melamine•melam•melem double salt, tends to be inadequate, whereby the desired baked product can hardly be obtainable. If it exceeds 400° C., the formed above-mentioned dimelam pyrosulfate, the melamine•melam•melem double salt of a polyacid comprising phosphorus, sulfur and oxygen, having a dimelam pyrosulfate structure, the melamine•melam•melem double salt of a polyphosphoric acid, the melamine•melam•melem double salt of a polyacid comprising phosphorus, sulfur and oxygen [carbon atom/phosphorus atom/sulfur atom=14/1/1 (molar ratio)], tend to decompose, thus leading to formation of ammonia or ammonium hydrogensulfate and volatilization of melamine, melam and melem, such being undesirable.

In the present invention, if the baking time is less than 0.1 hour, formation of the desired baked product tends to be inadequate, and it may be longer than 30 hours, but if it exceeds 30 hours, such is not economical.

For the baking of the present invention, a hot air dryer, a rotary kiln, a double-shaft type continuous kiln, a fluidized-bed kiln, etc., may be employed alone or in combination. During the baking, a gas will be generated due to decomposition or sublimation of melamine, and a baking furnace of a type capable of stirring during the baking, is preferred. Particularly preferred is a double-shaft type continuous kiln. Further, it is more referred that after baking by a double-shaft type continuous kiln, baking is carried out by a fluidized-bed kiln.

The baked product of the present invention may be pulverized and classified by a dry system pulverizer such as a mixer, a pin disk mill, a ball mill or a jet-o-mizer, or a dry system pulverization classifier such as a counter jet mill or an ionomizer, to obtain a fine powder having an average particle size (a median diameter) of at most 20 $\mu$m, which is preferred for an application as a flame retardant, more preferably an average particle size (a median diameter) of at most 10 $\mu$m.

Further, as a flame retardant, a pulverized product of the above baked product may be used, and a pulverized product adjusted by adding at most 25 wt % of an inorganic substance such as a silica powder or an inorganic basic substance, per 100 parts by weight of the baked product of the present invention, may also be used. The addition may be carried out from room temperature to 400° C. Namely, the addition may be carried out before the completion of the above baking, or the addition may be made to one cooled after completion of the baking. For such an addition, it is preferred to employ a mixing apparatus having a shearing force such as a Henschel mixer, a homogenizer or a homomixer, but a method of mixing by a V-type mixer or a universal mixer, followed by pulverization by a pulverizer such as a pin disk mill, a jet-o-mizer, a ball mill, a counter jet mill or an ionomizer, may also be employed. Also in such a case, by the pulverization, it is possible to obtain a fine powder having an average particle size of at most 20 $\mu$m, preferably an average particle size of at most 10 $\mu$m. Further, after mixing at room temperature, rebaking may be carried out at a temperature of from 340 to 400° C.

Here, the above-mentioned inorganic substance is a substance insoluble in water or having a low solubility. For example, magnesium hydroxide, aluminum hydroxide, calcium hydroxide, calcium silicate, magnesium silicate, calcium carbonate, silica powder, talc or zinc oxide may, for example, be mentioned as a preferred example. As such an inorganic substance, a commercially available one may be employed.

The flame retardant comprising the above-mentioned inorganic substance and the baked product of the present invention, may be made to have a solubility of from 0.01 to 0.10 g/100 ml in water (25° C.) and a pH of from 2.0 to 8.0 as a 10 wt % aqueous slurry (25° C.).

In the present invention, methods for evaluation of samples are as follows. Here, as samples, the products pulverized by a pin disk mill were employed.

(1) Elemental analysis (i) Carbon, nitrogen and hydrogen

Measured by means of an apparatus for elemental analysis 2400 CHN elemental analyzer (Perkin-Elmer Corp.)

(ii) Phosphorus

Measured by a phosphorus vanadomolybdate absorptiometry (iii) Sulfur

Treated by an oxygen flask combustion method and measured by ion chromatography.

(2) Differential thermal analysis

Measured by means of an apparatus for differential thermal analysis TG/DTA320U (manufactured by Seiko Instruments & Electronics, Ltd.).

(Measuring conditions)

Sample 11 mg, reference: α-alumina 11 mg,

Measuring temperature range: 25–1000° C. or 25–710° C.,

Temperature raising rate: 10° C./min (3) Powder X-ray diffraction

Measured by means of an apparatus for X-ray diffraction JEOL JDX-8200T (manufactured by JEOL Ltd.)

(Anticathode: Cu-Kα)

(4) Bulk specific gravity (loose apparent density)

Measured by means of a powder tester (manufactured by Hosokawa Micron Corp.)

(5) Average particle size

The 50% volume diameter (median diameter) was taken as the average particle size.

The 50% volume diameter (median diameter) was measured by means of a centrifugal sedimentation particle measuring apparatus SA-CP3 (manufactured by Shimadzu Corporation).

(Measuring conditions) Solvent: pure water (250° C.)

(6) pH of a 10 wt % aqueous slurry (250° C.)

Into a 300 ml beaker, 25 g of a sample was taken, and then, 225 ml (250° C.) of pure water measured by a measuring cylinder, was added thereto. Then, a magnetic stirring element was put into the beaker, followed by stirring by a magnetic stirrer for 30 minutes to obtain a 10 wt % aqueous slurry.

Then, the above 10 wt % aqueous slurry was measured by means of a pH meter M-8AD (manufactured by Horiba, Ltd.).

(7) Solubility (30 minutes) in water (250° C.)

Into a 300 ml beaker, 5.00 g (ag) of a sample was accurately weighed, and then, 250 ml (25° C.) of pure water measured by a measuring cylinder, was added thereto. Then, under a constant temperature (250° C.), a magnetic stirring element was put into the beaker, followed by stirring by a magnetic stirrer for 30 minutes to obtain a slurry. The obtained slurry was suction-filtered through a No. 5A filter which was preliminarily dried and had its weight accurately weighed. At that time, after once the filtration was completed, the filtrate was taken into a separate container, and with that filtrate, the slurry remaining in the beaker used for the preparation of the slurry, was washed and put onto the No. 5A filter paper which was used for the previous filtration and on which the undissolved sample was attached. Thus, the undissolved sample was recovered substantially in the entire amount on the No. 5A filter paper.

Then, into a Petri dish having its weight accurately weighed, the No. 5A filter paper having the undissolved sample recovered thereon, was put, and the Petri dish was put into a hot air dryer preliminarily heated to 80° C. and dried for 5 hours. Thereafter, the Petri dish was immediately put into a desiccator and left to cool.

After cooling, the total weight was measured, and the weights of the No. 5A filter paper and the Petri dish were subtracted from the total weight to obtain the amount of the undissolved sample (bg).

The solubility (g/100 ml) was obtained by a calculation formula of $100 \cdot (a-b)/250$.

(8) Solubility (24 hours) in water (250° C.)

Into a 300 ml beaker, 5.00 g (ag) of the sample was accurately weighed, and then, 250 ml (250° C.) of pure water measured by a measuring cylinder, was added thereto. Then, under a constant temperature (25° C.), a magnetic stirring element was put into the beaker, followed by stirring by a magnetic stirrer for 24 hours to obtain a slurry. After the preparation of this slurry, the solubility (g/100 ml) was obtained in the same manner as for the solubility (30 minutes) in water (250° C.).

(9) Solubility (36 hours) in water (250° C.)

Into a 300 ml beaker, 5.00 g (ag) of a sample was accurately weighed, and then, 250 ml (250° C.) of pure water measured by a measuring cylinder was added thereto. Then, under a constant temperature (250° C.), a magnetic stirring element was put into the beaker, followed by stirring for 36 hours to obtain a slurry. After the preparation of this slurry, the solubility (g/100 ml) was obtained in the same manner as for the solubility (30 minutes) in water (250° C.).

(10) High performance liquid chromatography

Melamine, melam, melem, etc., as base components in a sample, were measured by a high performance liquid chromatography apparatus, Hitachi L-400 (manufactured by Hitachi, Ltd.). As the column, a cation exchange resin type column was employed.

(Measuring conditions)

Column: PATISIL 10-SCX (250 mm×4.6 mm in diameter),

Carrier solvent: 0.05 M, pH 3.7, phosphate buffer solution,

Carrier flow rate: 1.5 ml/min,

Oven temperature: 400° C.,

Method for detection: UV detection method (230 nm)

Preparation of a sample solution for measurement:

5 mg of a sample was dissolved under heating in 49 g of an aqueous orthophosphoric acid solution having an orthophosphoric acid concentration of 85 wt % and then diluted to 500 ml with pure water to obtain a sample solution for measurement.

REFERENCE EXAMPLE 1

Step (a)

Into a 5 l universal mixer (made of stainless steel), 831.6 g (6.6 mols) of melamine (manufactured by Nissan Chemical Industries, Ltd.) was taken, and 230.6 g (orthophosphoric acid content: 2.0 mols) of an aqueous orthophosphoric acid solution having an orthophosphoric acid concentration of 85 wt % (manufactured by TOSOH CORPORATION) was added and mixed for 10 minutes, with stirring. After completion of the addition, stirring was continued for further 30 minutes. The melamine was 3.3 mols per mol of the orthophosphoric acid content. By the addition of this aqueous orthophosphoric acid solution, remarkable heat generation took place, and steam was generated. The obtained wet powder-like reaction product was 1034.5 g.

Step (b)

500 g of the wet powder-like reaction product obtained in step (a) was put into a stainless steel vat, and baking was carried out at 370° C. in an electric furnace as baking of the first stage. The temperature raising time was such that the temperature became 370° C. in about 1 hour, and the baking temperature was maintained at 370° C. for 3 hours. Certain agglomeration takes place due to dehydration, and to prevent such agglomeration, when the temperature of the baked product became 370° C., it was taken out, and the agglomerated one was disintegrated, whereupon the baking was continued. By the baking, sublimation of melamine and formation of ammonia due to decomposition of melamine were observed. Further, as the second stage, the temperature was raised to 380° C. (temperature raising time: 15 minutes), and maintained at 380° C. for 3 hours. By the baking, sublimation of melamine and formation of ammonia due to decomposition of melamine were remarkably observed. As the baked product, 322.1 g was obtained.

This baked product was cooled, and then pulverization was carried out by a pin disk mill. The obtained pulverized product had powder characteristics such that the bulk specific gravity was 0.6 g/ml and the average particle size was 13 μm.

As a result of the high performance liquid chromatography with respect to this baked product, the base components comprised melamine, melam and melem as the main components. Melamine/melam/melem=2.29/1.00/0.66 (molar ratio).

As a result of the elemental analysis, carbon was 24.25 wt %, nitrogen was 51.78 wt %, hydrogen was 3.97 wt %, and phosphorus was 8.50 wt %. In the baked product, the ratio of the nitrogen atom was 1.84 mols per mol of the carbon atom, which agreed to the ratio of the nitrogen atom being 1.86 mols per mol of the carbon atom as calculated from the result of the high performance liquid chromatography.

Melamine/melam/melem/phosphorus atom=0.98/0.43/0.29/1.0 (molar ratio), as calculated from the molar ratio of melamine, melam and melem as the base components in the high performance liquid chromatography and the results of carbon and phosphorus in the elemental analysis.

As a result of a differential thermal analysis of this baked product, a rapid decomposition took place at 630° C., which was similar to the decomposition of a melam salt, a melem salt or the like. This is clearly different from the thermal decomposition behavior of melamine polyphosphate, and this baked product is considered to be a melamine•melam•melem double salt of a polyphosphoric acid.

As a result of powder X-ray diffraction of this baked product, the positions of peaks substantially agree with the peaks of melamine polyphosphate, but the peaks are broad and clearly not of melamine polyphosphate. This melamine•melam•melem double salt of a polyphosphate showed characteristic X-ray diffraction peaks as shown in Table 1.

TABLE 1

Characteristic X-ray diffraction peaks of the
melamine·melam·melem
double salt of a polyphosphate

| 2 θ (°) | (anticathode: Cu-Kα) Intensity ratio (I/I) |
|---|---|
| 8.2 | 16 |
| 14.8 | 70 |
| 18.3 | 58 |
| 26.7 | 100 |

This baked product had a pH of 6.72 as a 10 wt % aqueous slurry (25° C.). Further, the solubility (30 minutes) in water (25° C.) showed a very small value of 0.03 g/100 ml. Likewise, the solubility (24 hours) in water (25° C.) showed a very small value of 0.05 g/100 ml.

REFERENCE EXAMPLE 2

Step (a)

Into a 5 l universal mixer (made of stainless steel), 1386 g (11.0 mols) of melamine (manufactured by Nissan Chemical Industries, Ltd.) was taken, and 890.9 g (sulfuric acid content: 5.0 mols) of an aqueous sulfuric acid solution having an sulfuric acid concentration of 55 wt %, was added and mixed in 10 minutes under stirring. After completion of the addition, stirring was continued for further 30 minutes. The melamine was 2.0 mols per mol of the sulfuric acid content. By the addition of this aqueous sulfuric acid solution, remarkable heat generation took place, and steam was generated. The obtained wet powder-like reaction product was 2030 g.

Step (b)

978.5 g of the wet powder-like reaction product obtained in step (a) was put into a stainless steel vat, and baking was carried out in an electric furnace at 310° C. as baking of the first stage. The temperature raising time was such that the temperature became 310° C. in about 1 hour, and the baking temperature was maintained at 310° C. for 2 hours. Certain agglomeration takes place due to dehydration, and to prevent such agglomeration, when the temperature of the baked product became 310° C., it was taken out, and the agglomerated one was disintegrated, whereupon the baking was continued. By the baking, sublimation of melamine and formation of ammonia due to decomposition of melamine were observed. Further, as the second stage, the temperature was raised to 370° C. (temperature raising time: 15 minutes), and maintained at 370° C. for 5 hours. By the baking, sublimation of melamine and formation of ammonia due to decomposition of melamine were remarkably observed. As a baked product, 758.9 g was obtained.

This baked product was cooled, and then, pulverization was carried out by a pin disk mill. The obtained pulverized product had powder characteristics such that the bulk specific gravity was 0.6 g/ml and the average particle size was 3.2 μm.

As a result of the high performance liquid chromatography with respect to this baked product, the base component comprised melam as the main component, and melamine was present in a very small amount. Melamine/meam/melem=0.03/1.00/0 (molar ratio). As a result of the elemental analysis, carbon was 22.8 wt %, nitrogen was 41.9 wt %, hydrogen was 3.76 wt % and phosphorus was 9.83 wt %. The ratio of the nitrogen atom was 1.84 mols per mol of the carbon atom in the baked product, which clearly agreed with the ratio of the nitrogen atom (theoretical value) of 1.83 mols per mol of the carbon atom of the melam salt. Further, the melamine/sulfur atom (molar ratio) was 1.03/1.0.

As a result of the differential thermal analysis of this baked product, no substantial weight reduction was observed up to 400° C., thus showing extremely good heat resistance. Further, abrupt decomposition occurred at 570° C., and this is believed to be attributable to decomposition of the melam salt. Accordingly, this baked product is considered to be dimelam pyrosulfate. As a result of the powder X-ray diffraction of this baked product, this dimelam pyrosulfate showed characteristic X-ray diffraction peaks as shown in Table 2.

TABLE 2

Characteristic X-ray diffraction peaks
of the dimelam pyrosulfate

| 2 θ (°) | (anticathode: Cu-Kα) Intensity ratio (I/I) |
|---|---|
| 10.6 | 7 |
| 19.6 | 37 |
| 21.3 | 37 |
| 27.4 | 100 |

This baked product had a pH of 3.31 as a 10 wt % aqueous slurry (25° C.). Further, the solubility (30 minutes) in water (250° C.) showed a very small value of 0.02 g/100 ml. Likewise, the solubility (24 hours) in water (250° C.) and the solubility (36 hours) in water (25° C.) respectively showed a very small value of 0.02 g/100 ml.

EXAMPLE 1

Step (a)

Into a 5 l universal mixer (made of stainless steel), 623.7 g (4.95 mols) of melamine (manufactured by Nissan Chemical Industries, Ltd.) was taken, and 57.6 g (orthophosphoric acid content: 0.5 mol) of an aqueous orthophosphoric acid solution having an orthophosphoric acid concentration of 85 wt %, 206.3 g (sulfuric acid content: 2.0 mols) of concentrated sulfuric acid having a sulfuric acid concentration of 95 wt % and 24.3 g of pure water, were added and mixed in 10 minutes under stirring. After completion of the addition, stirring was continued for further 30 minutes. The melamine was 1.98 mols per mol of the total molar amount of the orthophosphoric acid content and the sulfuric acid content. The sulfuric acid content was 4 mols per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 844 g.

Step (b)

500 g of the wet powder-like reaction product obtained in step (a) was put into a stainless steel vat, and baking was carried out at 340° C. in an electric furnace as baking of the first stage. The temperature raising time was such that the temperature became 340° C. in about 1 hour, and the baking temperature was maintained at 340° C. for 4 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 380° C. (temperature raising time: 15 minutes), and maintained at 380° C. for 3 hours. By the baking, sublimation of melamine and formation of ammonia due to decomposition of melamine were remarkably observed. As the baked product, 314.4 g was obtained.

This baked product was cooled, and then pulverization was carried out by a pin disk mill. The obtained pulverized product had powder characteristics such that the bulk specific gravity was 0.40 g/ml and the average particle size was 8.5 μm.

As a result of the high performance liquid chromatography with respect to the obtained baked product, the base components comprised melamine and melam as the essential components, and melem was present in a very small amount. Melamine/melam/melem 0.86/1.00/0.04 (molar ratio). As a result of the elemental analysis, carbon was 21.46 wt %, nitrogen was 45.91 wt %, hydrogen was 2.91 wt %, phosphorus was 2.05 wt %, and sulfur was 8.31 wt %. With this baked product, as a result of the differential thermal analysis, no substantial weight reduction was observed up to 350° C., thus showing very good heat resistance.

This baked product showed crystallizability, and as a result of the powder X-ray diffraction, the product agreed with the dimelam pyrosulfate of Reference Example 2 and had a dimelam pyrosulfate structure. The presence of the melamine•melam•melem double salt of a polyphosphoric acid of Reference Example 1, was not confirmed.

This baked product had a pH of 2.45 as a 10 wt % aqueous slurry (25° C.). Further, the solubility (30 minutes) in water (25° C.) showed a very small value of 0.05 g/100 ml.

EXAMPLE 2

Step (a)

Into a 5 l universal mixer (made of stainless steel), 623.7 g (4.95 mols) of melamine (manufactured by Nissan Chemical Industries, Ltd.) was taken, and 172.9 g (orthophosphoric acid content: 1.5 mols) of an aqueous orthophosphoric acid solution having an orthophosphoric acid concentration of 85 wt % (manufactured by TOSOH CORPORATION), 154.7 g (sulfuric acid content: 1.5 mols) of concentrated sulfuric acid having a sulfuric acid concentration of 95 wt %, and 18.2 g of pure water, were added and mixed in 10 minutes with stirring. After completion of the addition, stirring was continued for further 30 minutes. The melamine was 1.65 mols per mol of the total molar amount of the orthophosphoric acid content and the sulfuric acid content. The sulfuric acid content was 1 mol per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 944 g.

Step (b)

500 g of the wet powder-like reaction product obtained in step (a) was put into a stainless steel vat, and baking was carried out in an electric furnace at 340° C. as baking of the first stage. The temperature raising time was such that the temperature became 340° C. in about 1 hour, and the baking temperature was maintained at 340° C. for 4 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 380° C. (temperature raising time: 15 minutes), and maintained at 380° C. for 3 hours. By the baking, sublimation of melamine and formation of ammonia due to decomposition of melamine were remarkably observed. As the baked product, 359 g was obtained.

This baked product was cooled, and then, pulverization was carried out by a pin disk mill. The obtained pulverized product had powder characteristics such that the bulk specific gravity was 0.50 g/ml and the average particle size was 15 μm.

As a result of the powder X-ray diffraction, the baked product where the blend formulation shown in this Example was melamine/orthophosphoric acid content/sulfuric acid content (melamine/phosphorus atom/sulfur atom)=3.3/1.0/1.0 (molar ratio), showed crystallizability. And, the characteristic X-ray diffraction peaks shown in Table 3, substantially agreed with the X-ray diffraction peaks of the dimelam pyrosulfate of Reference Example 2, and it had a dimelam pyrosulfate structure. The presence of the structure of the melamine•melam•melem double salt of a polyphosphoric acid of Reference Example 1, was not confirmed.

TABLE 3

| Characteristic X-ray diffraction peaks of the baked product of Example 2 | |
|---|---|
| 2 θ (°) | (anticathode: Cu-Kα) Intensity ratio (I/I) |
| 10.6 | 12 |
| 19.5 | 42 |
| 21.3 | 44 |
| 27.3 | 100 |

Further, as a result of the high performance liquid chromatography with respect to the baked product, the base components comprised melamine and melam as the main components, and melem was present in a very small amount. Melamine/melam/melem=0.58/1.00/0.06 (molar ratio). As a result of the elemental analysis, carbon was 19.51 wt %, nitrogen was 43.78 wt %, and hydrogen was 3.94 wt %. From this result, the ratio of the nitrogen atom was 1.92 mols per mol of the carbon atom in the baked product.

This baked product was heated to 340° C. by an apparatus for differential thermal analysis to carry out the elemental analysis of the heat-treated baked product, whereby carbon was 18.45 wt %, nitrogen was 39.65 wt %, hydrogen was 4.01 wt %, phosphorus was 6.04 wt %, and sulfur was 6.07 wt %. From this result, the ratio of the nitrogen atom was 1.84 mols per mol of the carbon atom in the baked product. From this, it is assumed that the molar ratio of the nitrogen atom to the carbon atom in the baked product became high, since in the baked product, in addition to the melam salt, etc., ammonia formed by the decomposition of melamine, remained. In this baked product, carbon atom/phosphorus atom/sulfur atom=8.11/1.03/1.00 (molar ratio).

This baked product had a pH of 2.65 as a 10 wt % aqueous slurry (25° C.). Further, the solubility (30 minutes) in water (25° C.) showed a very small value of 0.05 g/100 ml.

EXAMPLE 3

Step (a)

Into a 5 l universal mixer (made of stainless steel), 693 g (5.5 mols) of melamine (manufactured by Nissan Chemical Industries, Ltd.) was taken, and a mixed aqueous solution comprising 115.3 g (orthophosphoric acid content: 1.0 mols) of an aqueous orthophosphoric acid solution having an orthophosphoric acid concentration of 85 wt % (manufactured by TOSOH CORPORATION), 103.2 g (sulfuric acid content: 1.0 mol) of concentrated sulfuric acid having a sulfuric acid concentration of 95 wt % and 12 g of pure water, was added and mixed in 10 minutes under stirring. After completion of the addition, stirring was continued for further 30 minutes. The melamine was 2.75 mols per mol of the total molar amount of the orthophosphoric acid content and the sulfuric acid content. The sulfuric acid content was 1 mol per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 960 g.

Step (b)

480 g of the wet powder-like reaction product obtained in step (a) was put into a stainless steel vat, and baking was carried out at 340° C. in an electric furnace as baking of the first stage. The temperature raising time was such that the temperature became 340° C. in about 1 hour, and the baking temperature was maintained at 340° C. for 5 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 370° C. (temperature raising time: 15 minutes), and maintained at 370° C. for 4 hours. By the baking, sublimation of melamine and formation of ammonia due to decomposition of melamine were remarkably observed. As the baked product, 329.7 g was obtained. This baked product was cooled, and then, pulverization was carried out by a pin disk mill. The obtained pulverized product had powder characteristics such that the bulk specific gravity was 0.50 g/ml and the average particle size was 14 μm.

The baked product where the blend composition shown in this Example was melamine/orthophosphoric acid content/sulfuric acid content (melamine/phosphorus atom/sulfur atom)=5.5/1.0/1.0 (molar ratio), was crystallizable, and as a result of the powder X-ray diffraction, was confirmed to be a new compound, as it did not agree with the X-ray diffraction peaks of melamine sulfate, melamine phosphate, dimelam pyrophosphate or a melamine•melam•melem double salt of a polyphosphoric acid. This new compound showed characteristic X-ray diffraction peaks as shown in Table 4.

TABLE 4

| Characteristic X-ray diffraction peaks of the baked product of Example 3 | |
|---|---|
| 2 θ (°) | (anticathode: Cu-Kα) Intensity ratio (I/I) |
| 6.1 | 28 |
| 10.3 | 31 |
| 19.0 | 68 |
| 28.6 | 100 |

As a result of the high performance liquid chromatography of this compound, the base components comprised melam and melamine as the main components, and melem was present in a very small amount. Melamine/melam/melem=0.84/1.00/0.02 (molar ratio). As a result of the elemental analysis, carbon was 23.12 wt %, nitrogen was 49.52 wt %, hydrogen was 4.08 wt %, phosphorus was 4.40 wt %, and sulfur was 4.37 wt %. The ratio of the nitrogen atom was 1.84 mols per mol of the carbon atom in the baked product.

This baked product was crystallizable, and from the result of the X-ray diffraction and the result of the elemental analysis, this compound was determined to be a melamine•melam•melem double salt of a polyacid comprising phosphorus, sulfur and oxygen (carbon atom/phosphorus atom/sulfur atom=14.1/1.04/1.00 (molar ratio)).

The carbon atom/the phosphorus atom (molar ratio) of the melamine•melam•melem double salt of a polyphosphoric acid was 7.37/1.00 as the measured values of Reference Example 1, and the carbon atom/the sulfur atom (molar ratio) of the dimelam pyrosulfate was 6.19/1.00 by the measured values in Reference Example 2. Accordingly, if it is assumed that the melamine•melam•melem double salt of a polyacid comprising phosphorus, sulfur and oxygen is a double salt comprising one molecule of dimelam pyrosulfate and one molecule of a melamine•melam•melem double salt of a polyphosphoric acid, the carbon atom/the phosphorus atom/the sulfur atom (molar ratio) becomes to be 13.6/1/1, thus showing values close to the measured values. This baked product is assumed to be a compound wherein the melamine•melam•melem double salt of a polyphosphoric acid and the dimelam pyrosulfate were regularly bonded.

As a result of the differential thermal analysis of this baked product, no substantial weight reduction was observed up to 350° C., and the product was very stable. Decomposition started from 400° C. , and rapid heat generation and decomposition were observed at 6300° C. This abrupt decomposition at 6300° C. agrees with the decomposition of melem.

This baked product had a pH of 3.09 as a 10 wt % aqueous slurry (250° C. ). Further, the solubility (30 minutes) in water (25° C. ) showed a very small value of 0.03 g/100 ml.

EXAMPLE 4

Step (a)

Into a 5 l universal mixer (made of stainless steel) 623.7 g (4.95 mols) of melamine (manufactured by Nissan Chemical Industries, Ltd. ) was taken, and a mixed aqueous solution comprising 57.6 g (orthophosphoric acid content: 0.5 mol) of an aqueous orthophosphoric acid solution having an orthophosphoric acid concentration of 85 wt % (manufactured by TOSOH CORPORATION) and 269.8 g (sulfuric acid content: 1.5 mols) of an aqueous ammonium hydrogensulfate solution having an ammonium hydrogensulfate concentration of 64 wt %, was added and mixed in 10 minutes under stirring. After completion of the addition, stirring was continued for further 30 minutes. The melamine was 2.48 mols per mol of the total molar amount of the orthophosphoric acid content and the sulfuric acid content. The sulfuric acid content was 3 mols per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 920 g.

Step (b)

460 g of the wet powder-like reaction product obtained in step (a) was put into a stainless steel vat, and baking was carried out at 340° C. in an electric furnace as baking of the first stage. The temperature raising time was such that the temperature became 340° C. in about 1 hour, and the baking temperature was maintained at 340° C. for 5 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 370° C. (temperature raising time: 15 minutes), and maintained at 370° C. for 3 hours. By the baking, sublimation of melamine and formation of ammonia due to decomposition of melamine were remarkably observed. As the baked product, 320.5 g was obtained. This baked product was cooled, and then, pulverization was carried out by a pin disk mill. The obtained pulverized product had powder characteristics such that the bulk specific gravity was 0.45 g/ml and the average particle size was 8.2 $\mu$m.

As a result of the high performance liquid chromatography with respect to this baked product, the base components comprised melamine and melam as the main components, and melem was a subsidiary component. Melamine/melam/melem=1.13/1.00/0.21 (molar ratio). As a result of the elemental analysis, carbon was 22.48 wt %, nitrogen was 48.44 wt %, hydrogen was 3.63 wt %, phosphorus was 2.39 wt %, and sulfur was 7.12 wt %.

The baked product showed crystallizability, and as a result of the powder X-ray diffraction, it had the melamine•melam•melem double salt structure of a polyacid comprising phosphorus, sulfur and oxygen (carbon atoms/phosphorus atom/sulfur atom=14.1/1.04/1.00 (molar ratio)) as disclosed in Example 3 and the dimelam pyrophosphate structure. It is assumed to be a mixture of dimelam pyrosulfate and a melamine•melam•melem double salt of a polyacid comprising phosphorus, sulfur and oxygen. As a result of the differential thermal analysis, no substantial weight reduction was observed up to 350° C., and the obtained baked product showed excellent heat resistance.

This baked product had a pH of 3.21 as a 10 wt % aqueous slurry (25° C.). Further, the solubility (30 minutes) in water (25° C.) showed a very small value of 0.03 g/100 ml.

EXAMPLE 5

Step (a)

Into a 10 l Henschel mixer (made of stainless steel), 1164.3 g (9.24 mols) of melamine (manufactured by Nissan Chemical Industries, Ltd.) was taken, and a mixed aqueous solution comprising 276.8 g (orthophosphoric acid content: 2.4 mols) of an aqueous orthophosphoric acid solution having an orthophosphoric acid concentration of 85 wt % (manufactured by TOSOH CORPORATION), 61.9 g (sulfuric acid content: 0.6 mol) of concentrated sulfuric acid having a sulfuric acid concentration of 95 wt %, and 7.3 g of pure water, was added and mixed in 10 minutes with stirring. After completion of the addition, stirring was continued for further 30 minutes. The melamine was 3.08 mols per mol of the total molar amount of the orthophosphoric acid content and the sulfuric acid content. The sulfuric acid content was 0.25 mol per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 1512 g.

Step (b)

907.2 g of the wet powder-like reaction product obtained in step (a), was put into a stainless steel vat, and baking was carried out at 340° C. in an electric furnace as baking of the first stage. The temperature raising time was such that the temperature became 340° C. in about 1 hour, and the baking temperature was maintained at 340° C. for 4 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 370° C. (temperature raising time: 15 minutes) and maintained at 370° C. for 4 hours. By the baking, sublimation of melamine and formation of ammonia due to decomposition of melamine were remarkably observed. As the baked product, 611.5 g was obtained.

After cooling this baked product, pulverization was carried out by a pin disk mill. The obtained pulverized 10 product had powder characteristics such that the bulk specific gravity was 0.50 g/ml and the average particle size was 13 $\mu$m.

As a result of the powder X-ray diffraction, the baked product having the blend composition shown in this Example being melamine/orthophosphoric acid/sulfuric acid content (melamine/phosphorus atom/sulfur atom)=15.4/4.0/1.0 (molar ratio), was crystalline and was confirmed to be a mixture comprising a small amount of the melamine•melam•melem double salt of a polyacid comprising phosphorus, sulfur and oxygen, as disclosed in Example 3 and a large amount of a melamine•melam•melem double salt of a polyphosphoric acid. As a result of the high performance liquid chromatography, the base components comprised melamine and melam as the main components, and melem was present in a very small amount. Melamine/melam/melem=1.37/1.00/0.02 (molar ratio). As a result of the elemental analysis, carbon was 23.67 wt %, nitrogen was 49.69 wt %, hydrogen was 3.74 wt %, phosphorus was 7.20 wt %, and sulfur was 1.77 wt %.

This baked product had a ratio of carbon atom/phosphorus atom/sulfur atom=35.9/4.22/1.00 (molar ratio).

As a result of the differential thermal analysis of this baked product, it was found that the weight reduction was small up to 350° C. (only a very small amount of adsorbed water is believed to be present), and decomposition started from 380° C. and remarkable decomposition took place at 630° C. This rapid decomposition agrees with the decomposition of melam and melem and is remarkably different from the thermal decomposition behavior of melamine polyphosphate.

This baked product had a pH of 4.10 as a 10 wt % aqueous slurry (25° C.). Further, the solubility (30 minutes) in water (25° C.) showed a very small value of 0.03 g/100 ml.

EXAMPLE 6

Into a 10 l Henschel mixer (made of stainless steel) 1801.8 g (14.3 mols) of melamine (manufactured by Nissan Chemical Industries, Ltd.) was taken, and a mixed aqueous solution comprising 51.6 g (sulfuric acid content: 0.5 mol) of concentrated sulfuric acid having a sulfuric acid concentration of 95 wt % and 46.4 g of pure water, was added and mixed in 10 minutes with stirring, followed by stirring for 30 minutes. Then, 465.2 g (orthophosphoric acid content: 4.0 mols) of an aqueous orthophosphoric acid solution having an orthophosphoric acid concentration of 85 wt % (manufactured by TOSOH CORPORATION), was added and mixed in 10 minutes. After completion of the addition, the stirring was continued for further 30 minutes. The melamine was 3.18 mols per mol of the total molar amount of the orthophosphoric acid content and the sulfuric acid content. The sulfuric acid content was 0.125 mol per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 1130 g.

Step (b)

1130 g of the wet powder-like reaction product obtained in step (a), was put into a stainless steel vat, and baking was carried out at 340° C. in an electric furnace as baking of the first stage. The temperature raising time was such that the temperature became 340° C. in about 1 hour, and the baking temperature was maintained at 340° C. for 4 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 370° C. (temperature raising time: 15 minutes) and maintained at 370° C. for 4 hours. By the baking, sublimation of melamine and formation of ammonia due to decomposition of melamine were remarkably observed. As the baked product, 755.2 g was obtained.

This baked product was cooled, and then pulverization was carried out by a pin disk mill. The obtained pulverized product had powder characteristics such that the bulk specific gravity was 0.50 g/ml and the average particle size was 13.0 μm.

As a result of the elemental analysis with respect to this baked product, carbon was 23.64 wt %, nitrogen was 50.34 wt %, hydrogen was 3.41 wt %, phosphorus was 7.80 wt %, and sulfur was 1.00 wt %.

As a result of the powder X-ray diffraction, it was confirmed to be a mixture comprising a small amount of the melamine•melam•melem double salt of a polyacid comprising phosphorus, sulfur and oxygen as disclosed in Example 3 and a large amount of a melamine•melam•melem double salt of a polyphosphoric acid.

As a result of the differential thermal analysis, no substantial weight reduction was observed up to 350° C., and the obtained baked product showed excellent heat resistance.

This baked product had a pH of 5.81 as a 10 wt % aqueous slurry (25° C.). Further, the solubility (30 minutes) in water (25° C.) showed a very small value of 0.02 g/100 ml.

EXAMPLE 7

Step (a)

Into a 10 l Henschel mixer (made of stainless steel), 1746.4 g (13.86 mols) of melamine (manufactured by Nissan Chemical Industries, Ltd.) was taken, and a mixed aqueous solution comprising 92.8 g (sulfuric acid content: 0.9 mol) of concentrated sulfuric acid having a sulfuric acid concentration of 95 wt %, and 54.1 g of pure water, was added and mixed in 10 minutes with stirring, followed by stirring for 30 minutes. Then, 415.1 g (orthophosphoric acid content: 3.6 mols) of an aqueous orthophosphoric acid solution having an orthophosphoric acid concentration of 85 wt %, was added and mixed in 10 minutes. After completion of the addition, the stirring was continued for further 30 minutes. The melamine was 3.08 mols per mol of the total molar amount of the orthophosphoric acid content and the sulfuric acid content. The sulfuric acid content was 0.25 mol per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 2204 g.

Step (b)

1102 g of the wet powder-like reaction product obtained in step (a), was put into a stainless steel vat, and baking was carried out at 340° C. in an electric furnace as baking of the first stage. The temperature raising time was such that the temperature became 340° C. in about 1 hour, and the baking temperature was maintained at 340° C. for 4 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 370° C. (temperature raising time: 15 minutes) and maintained at 370° C. for 4 hours. By the baking, sublimation of melamine and formation of ammonia due to decomposition of melamine were remarkably observed. As the baked product, 750.3 g was obtained.

This baked product was cooled, and then, pulverization was carried out by a pin disk mill. The obtained pulverized product had powder characteristics such that the bulk specific gravity was 0.42 g/ml and the average particle size was 11.0 μm.

As a result of the elemental analysis with respect to this baked product, carbon was 23.36 wt %, nitrogen was 49.77 wt %, hydrogen was 2.64 wt %, phosphorus was 7.20 wt %, and sulfur was 1.69 wt %.

As a result of the powder X-ray diffraction, it was confirmed that the product was crystalline and confirmed to be a mixture comprising a small amount of the melamine•melam•melem double salt of a polyacid comprising phosphorus, sulfur and oxygen, as disclosed in Example 3 and a large amount of a melamine•melam•melem double salt of a polyphosphoric acid. As a result of the differential thermal analysis, no substantial weight reduction was observed at 350° C., and the obtained baked product showed excellent heat resistance.

This baked product had a pH of 4.84 as a 10% aqueous slurry (250° C.). Further, the solubility in water (25° C.) showed a very small value of 0.01 g/100 ml.

EXAMPLE 8

Into a 5 l universal mixer (made of stainless steel), 693 g (5.5 mols) of melamine (manufactured by Nissan Chemical Industries, Ltd.) was taken, and a mixed aqueous solution comprising 115.3 g (orthophosphoric acid content: 1.0 mol) of an aqueous orthophosphoric acid solution having an orthophosphoric acid concentration of 85 wt % (manufactured by TOSOH CORPORATION) and 206.4 g (sulfuric acid content: 1.0 mol) of an aqueous ammonium sulfate solution having an ammonium sulfate concentration of 64 wt %, was added and mixed in 10 minutes with stirring. After completion of the addition, stirring was continued for further 30 minutes. The melamine was 2.75 mols per mol of the total molar amount of the orthophosphoric acid content and the sulfuric acid content. The sulfuric acid content was 1.0 mol per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 984 g.

Step (b)

492 g of the wet powder-like reaction product obtained in step (a), was put into a stainless steel vat, and baking was carried out at 340° C. in an electric furnace as baking of the first stage. The temperature raising time was such that the temperature became 340° C. in about 1 hour, and the baking temperature was maintained at 340° C. for 5 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 370° C. (temperature raising time: 15 minutes) and maintained at 370° C. for 4 hours. By the baking, sublimation of melamine and formation of ammonia due to decomposition of melamine were remarkably observed. As the baked product, 330 g was obtained.

This baked product was cooled, and then, pulverization was carried out by a pin disk mill. The obtained pulverized product had powder characteristics such that the bulk specific gravity was 0.50 g/ml and the average particle size was 14.0 $\mu$m.

As a result of the elemental analysis with respect to this baked product, carbon was 22.60 wt %, nitrogen was 49.10 wt %, hydrogen was 4.11 wt %, phosphorus was 4.40 wt %, and sulfur was 4.37 wt %.

As a result of the powder X-ray diffraction, the product was crystalline and confirmed to be the melamine•melam•melem double salt of a polyacid comprising phosphorus, sulfur and oxygen as disclosed in Example 3.

As a result of the differential thermal analysis, no substantial weight reduction was observed up to 350° C., and the obtained baked product showed excellent heat resistance.

This baked product had a pH of 2.78 as a 10 wt % aqueous slurry (25° C.). Further, the solubility in water (25° C.) showed a very small value of 0.03 g/100 ml.

EXAMPLE 9

Step (b)

500 g of the wet powder-like reaction product obtained in Example 5 was put into a stainless steel vat, and baking was carried out at 320° C. in an electric furnace as baking of the first stage. The temperature raising time was such that the temperature became 320° C. in about 1 hour, and the baking temperature was maintained at 320° C. for 4 hours. Certain agglomeration takes place due to dehydration, and to prevent such agglomeration, when the temperature of the baked product became 320° C., it was taken out, and the agglomerated one was disintegrated, whereupon the baking was continued. By the baking, sublimation of melamine and formation of ammonia due to decomposition of melamine were observed. Further, as the second stage, the temperature was raised to 380° C. (temperature raising time: 15 minutes) and maintained at 380° C. for 3 hours. By the baking, sublimation of melamine and formation of ammonia due to decomposition of melamine were remarkably observed. As the baked product, 330 g was obtained. This baked product was cooled, and then pulverization was carried out by a pin disk mill. The obtained pulverized product had powder characteristics such that the bulk specific gravity was 0.50/ ml and the average particle size was 14.5 $\mu$m.

As a result of the elemental analysis with respect to this baked product, carbon was 23.4 wt %, nitrogen was 50.10 wt %, hydrogen was 4.09 wt %, phosphorus was 4.40 wt %, and sulfur was 1.77 wt %.

As a result of the powder X-ray diffraction, the product was crystalline and confirmed to be a mixture comprising a small amount of the melamine•melam•melem double salt of a polyacid comprising phosphorus, sulfur and oxygen as disclosed in Example 3 and a large amount of a melamine•melam•melem double salt of a polyphosphoric acid.

As a result of the differential thermal analysis, no substantial weight reduction was observed up to 350° C., and the obtained baked product showed excellent heat resistance.

This baked product had a pH of 3.87 as a 10 wt % aqueous slurry (25° C.). Further, the solubility in water (25° C.) showed a very small value of 0.03 g/100 ml.

EXAMPLE 10

Step (a)

Into a 5 l universal mixer (made of stainless steel), 623.7 g (4.95 mols) of melamine (manufactured by Nissan Chemical Industries, Ltd.) was taken, and 345.9 g (orthophosphoric acid content: 3.0 mols) of an aqueous orthophosphoric acid solution having an orthophosphoric acid concentration of 85 wt % (manufactured by TOSOH CORPORATION), 77.4 g (sulfuric acid content: 0.75 mol) of concentrated sulfuric acid having a sulfuric acid concentration of 95 wt % and 9.1 g of pure water, were added and mixed in 10 minutes with stirring. After completion of the addition, stirring was continued for further 30 minutes. The melamine was 1.32 mols per mol of the total molar amount of the orthophosphoric acid content and the sulfuric acid content. The sulfuric acid content was 0.25 per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 1006 g.

Step (b)

500 g of the wet powder-like reaction product obtained in step (a) was put into a stainless steel vat, and baking was carried out at 340° C. in an electric furnace as baking of the first stage. The temperature raising time was such that the temperature became 340° C. in about 1 hour, and the baking temperature was maintained at 340° C. for 4 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 380° C. (temperature raising time: 15 minutes) and maintained at 380° C. for 4 hours. By the baking, sublimation of melamine and formation of ammonia due to decomposition of melamine were remarkably observed. As the baked product, 340.6 g was obtained.

This baked product was cooled, and then pulverization was carried out by a pin disk mill. The obtained pulverized product had powder characteristics such that the bulk specific gravity was 0.60 g/ml and the average particle size was 14 μm.

As a result of the high performance liquid chromatography with respect to this baked product, the base components comprised melamine and melam as the main components, and melem was a subsidiary component. Melamine/melam/melem=2.16/1.00/0.11 (molar ratio). As a result of the elemental analysis, carbon was 18.68 wt %, nitrogen was 40.54 wt %, hydrogen was 3.64 wt %, phosphorus was 11.93 wt %, and sulfur was 2.62 wt %.

As a result of the powder X-ray diffraction, this baked product showed the X-ray diffraction peaks as identified in Table 5.

TABLE 5

X-ray diffraction peaks
of the baked product of Example 10

| 2 θ (°) | (anticathode: Cu-Kα) Intensity ratio (I/I) |
|---|---|
| ○ 8.2 | 20 |
| △ 10.6 | 16 |
| ○ 14.8 | 76 |
| ○ 18.2 | 70 |
| △ 19.4 | 41 |
| △ 21.3 | 51 |
| ○ 26.7 | 86 |
| △ 27.3 | 92 |

(note)
○: melamine•melam•melem double salt of a polyphosphoric acid,
△: dimelam pyrosulfate This product showed crystallizability and had a structure of a melamine•melam•melem double salt of a polyphosphoric acid and a structure of dimelam pyrosulfate. It was a 1,3,5-triazine derivative salt mixture comprising a melamine•melam•melem double salt of a polyphosphoric acid and dimelam pyrosulfate.

This baked product had a pH of 2.76 as a 10 wt % aqueous slurry (250° C.). Further, the solubility (30 minutes) in water (250° C.) showed a very small value of 0.05 g/100 ml.

EXAMPLE 11

Step (a)

Into a 5 l universal mixer (made of stainless steel), 1039.5 g (8.25 mols) of melamine (manufactured by Nissan Chemical Industries, Ltd.) was taken, and a mixed aqueous solution comprising 778.2 g (orthophosphoric acid content: 6.75 mols) of an aqueous orthophosphoric acid solution having an orthophosphoric acid concentration of 85 wt % (manufactured by TOSOH CORPORATION) and 134.8 g (sulfuric acid content: 0.75 mol) of concentrated sulfuric acid having a sulfuric acid concentration of 95 wt %, was added and mixed in 10 minutes with stirring. After completion of the addition, the stirring was continued for further 30 minutes. The melamine was 1.1 mols per mol of the total molar amount of the orthophosphoric acid content and the sulfuric acid content. The sulfuric acid content was 0.11 per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 1851 g.

Step (b)

500 g of the wet powder-like reaction product obtained in step (a) was put into a stainless steel vat, and baking was carried out at 340° C. in an electric furnace as baking of the first stage. The temperature raising time was such that the temperature became 340° C. in about 1 hour, and the baking temperature was maintained at 340° C. for 4 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 380° C. (temperature raising time: 15 minutes) and maintained at 380° C. for 5 hours. By the baking, sublimation of melamine and formation of ammonia due to decomposition of melamine were remarkably observed. As the baked product, 308.2 was obtained.

This baked product was cooled, and then, pulverization was carried out by a pin disk mill. The obtained pulverized product had powder characteristics such that the bulk specific gravity was 0.63 g/ml and the average particle size was 13 μm.

As a result of the high performance liquid chromatography with respect to this baked product, the base components comprised melamine and melam as the main components, and melem was a subsidiary component. Melamine/melam/melem=3.09/1.00/0.24 (molar ratio). As a result of the elemental analysis, carbon was 16.30 wt %, nitrogen was 35.37 wt %, hydrogen was 2.04 wt %, phosphorus was 15.60 wt %, and sulfur was 1.27 wt %.

This baked product showed crystallizability and had a structure of a melamine•melam•melem double salt of a polyphosphoric acid and a structure of dimelam pyrosulfate. It was a 1,3,5-triazine derivative salt mixture comprising a melamine•melam•melem double salt of a polyphosphoric acid and dimelam pyrosulfate.

As a result of the differential thermal analysis of this baked product, no substantial weight reduction was observed up to 350° C., and the product showed excellent heat resistance.

This baked product had a pH of 2.34 as a 10 wt % aqueous slurry (25° C.). Further, the solubility (30 minutes) in water (25° C.) showed a very small value of 0.05 g/100 ml.

EXAMPLE 12

Step (a)

Into a 5 l universal mixer (made of stainless steel), 756 g (6.0 mols) of melamine (manufactured by Nissan Chemical Industries, Ltd.) was taken, and a mixed aqueous solution comprising 461.2 g (orthophosphoric acid content: 4.0 mols) of an aqueous orthophosphoric acid solution having an orthophosphoric acid concentration of 85 wt % (manufactured by TOSOH CORPORATION), 103.2 g (sulfuric acid content: 1.0 mol) of concentrated sulfuric acid having a sulfuric acid concentration of 95 wt %, and 12.1 g of pure water, was added and mixed in 10 minutes with stirring. After completion of the addition, stirring was continued for further 30 minutes. The melamine was 1.2 mols per mol of the total molar amount of the orthophosphoric acid content and the sulfuric acid content. The sulfuric acid content was 0.25 mol per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 1259.2 g.

Further, 1259.2 g (total amount) of this obtained wet powder-like reaction product was taken into a 10 l Henschel mixer, and 213.4 g (1.69 mols) of melamine (manufactured by Nissan Chemical Industries, Ltd.) was added with stirring (2600 rpm), followed by stirring for 10 minutes. Then, a mixed aqueous solution comprising 115.3 g (orthophosphoric acid content: 1.0 mol) of an aqueous orthophosphoric acid solution having an orthophosphoric acid concentration of 85 wt % (manufactured by TOSOH CORPORATION), 25.8 g (sulfuric acid content: 0.25 mol) of concentrated sulfuric acid having a sulfuric acid concentration of 95 wt % and 3.0 g of pure water, was added and mixed in 10 minutes. By the addition of this mixed aqueous solution comprising the aqueous orthophosphoric acid solution, concentrated sulfuric acid and water, remarkable heat generation took place, and steam was generated. The obtained wet powder-like reaction product was 1800 g. The final blend composition of this wet powder-like reaction product was melamine/orthophosphoric acid/sulfuric acid content (melamine/phosphorus atom/sulfur atom)=6.125/4.0/1.0 (molar ratio).

Step (b)

500 g of the wet powder-like reaction product obtained in step (a) was put into a stainless steel vat, and baking was carried out at 340° C. in an electric furnace as baking of the first stage. The temperature raising time was such that the temperature became 340° C. in about 1 hour, and the baking temperature was maintained at 340° C. for 4 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 380° C. (temperature raising time: 15 minutes) and maintained at 380° C. for 5 hours. By the baking, sublimation of melamine and formation of ammonia due to decomposition of melamine were remarkably observed. As the baked product, 342.9 g was obtained.

This baked product was cooled, and then, pulverization was carried out by a pin disk mill. The obtained pulverized product had powder characteristics such that the bulk specific gravity was 0.60 g/ml and the average particle size was 14 µm.

As a result of the high performance liquid chromatography with respect to this baked product, the base components comprised melamine and melam as the main components, and melem was a subsidiary component. As a result of the elemental analysis, carbon was 19.32 wt %, nitrogen was 41.66 wt %, hydrogen was 3.51 wt %, phosphorus was 10.49 wt %, and sulfur was 2.39 wt %.

As a result of the powder X-ray diffraction, this baked product showed crystallizability and had a structure of a melamine•melam•melem double salt of a polyphosphoric acid and a structure of dimelam pyrosulfate. It was a 1,3,5-triazine derivative salt mixture comprising a melamine•melam•melem double salt of a polyphosphoric acid and dimelam pyrosulfate.

As a result of the differential thermal analysis, no substantial weight reduction was observed up to 350° C., and the obtained baked product showed excellent heat resistance.

This baked product had a pH of 2.78 as a 10 wt % aqueous slurry (25° C.). Further, the solubility (30 minutes) in water (25° C.) showed a very small value of 0.03 g/100 ml.

EXAMPLE 13

Step (a)

Into a 5 l universal mixer (made of stainless steel) 1663.2 g (13.2 mols) of melamine (manufactured by Nissan Chemical Industries, Ltd.) was taken, and a mixed aqueous solution comprising 206.3 g (sulfuric acid content: 2.0 mol) of concentrated sulfuric acid having a sulfuric acid concentration of 95 wt % and 120.3 g of pure water, was added and mixed in 10 minutes with stirring, and stirred for 30 minutes. Then, 922.4 g (orthophosphoric acid content: 8.0 mols) of an aqueous orthophosphoric acid solution having an orthophosphoric acid concentration of 85 wt % (manufactured by TOSOH CORPORATION) was added and mixed in 10 minutes. After completion of the addition, stirring was continued for further 30 minutes. The melamine was 1.32 mols per mol of the total molar amount of the orthophosphoric acid content and the sulfuric acid content. The sulfuric acid content was 0.25 mol per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 2700 g.

Step (b)

1100 g of the wet powder-like reaction product obtained in step (a) was put into a stainless steel vat, and baking was carried out at 340° C. in an electric furnace as baking of the first stage. The temperature raising time was such that the temperature became 340° C. in about 1 hour, and the baking temperature was maintained at 340° C. for 4 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 370° C. (temperature raising time: 15 minutes) and maintained at 370° C. for 4 hours. By the baking, sublimation of melamine and formation of ammonia due to decomposition of melamine were remarkably observed. As the baked product, 767.8 g was obtained.

This baked product was cooled, and then, pulverization was carried out by a pin disk mill. The obtained pulverized product had powder characteristics such that the bulk specific gravity was 0.45 g/ml and the average particle size was 12 µm.

As a result of the high performance liquid chromatography with respect to this baked product, the base components comprised melamine and melam as the main components, and melem was a subsidiary component. As a result of the elemental analysis, carbon was 18.87 wt %, nitrogen was 40.95 wt %, hydrogen was 3.44 wt %, phosphorus was 11.91 wt %, and sulfur was 2.66 wt %.

As a result of the powder X-ray diffraction, this baked product showed crystallizability and had a structure of a melamine•melam•melem double salt of a polyphosphoric acid and a structure of dimelam pyrosulfate. It was a 1,3,5-triazine derivative salt mixture comprising a melamine•melam•melem double salt of a polyphosphoric acid and dimelam pyrosulfate.

As a result of the differential thermal analysis, no substantial weight reduction was observed up to 350° C., and the obtained baked product showed excellent heat resistance.

COMPARATIVE EXAMPLE 1

Step (b)

500 g of the wet powder-like reaction product obtained in Example 10 was put into a stainless steel vat, and baking was carried out at 300° C. in an electric furnace. The temperature raising time was such that the temperature became 300° C. in about 1 hour, and then baking temperature was maintained at 300° C. for 5 hours. Certain agglomeration takes place due to dehydration, and to prevent such agglomeration, when the temperature of the baked product became 300° C., it was taken out, and the agglomerated one was disintegrated, whereupon the baking was continued. By the baking, sublimation of melamine and formation of ammonia due to decomposition of melamine were observed. As the baked product, 350 g was obtained.

This baked product was subjected to pulverization by a pin disk mill. The pulverized product had a powder characteristic of an average particle size of 12 μm.

As a result of the elemental analysis with respect to this baked product, carbon was 18.76 wt %, nitrogen was 42.92 wt %, hydrogen was 3.86 wt %, phosphorus was 11.89 wt %, and sulfur was 2.62 wt %. The proportion of the nitrogen atom was 1.96 mols per mol of the carbon atom in the baked product, and when the nitrogen atom/carbon atom (molar ratio) was calculated as a mixture of melamine a polyphosphoric acid and dimelam pyrosulfate from the phosphorus atom/sulfur atom (molar ratio) of this baked product being 4.68, it became 1.95, which substantially agreed.

As a result of the differential thermal analysis, a weight reduction of 10 wt % was observed up to 350° C., and the obtained baked product had poor heat resistance.

This baked product had a pH of 3.24 as a 10 wt % aqueous slurry (25° C.). Further, the solubility (30 minutes) in water (25° C.) was 0.05/100 ml.

COMPARATIVE EXAMPLE 2

Step (a)

Into a 5 l universal mixer (made of stainless steel), 434.7 g (3.45 mols) of melamine (manufactured by Nissan Chemical Industries, Ltd.) was taken, and 345.9 g (orthophosphoric acid content: 3.0 mols) of an aqueous orthophosphoric acid solution having an orthophosphoric acid concentration of 85 wt % (manufactured by TOSOH CORPORATION), 77.4 g (sulfuric acid content: 0.75 mol) of concentrated sulfuric acid having a sulfuric acid concentration of 95 wt % and 9.1 g of pure water were added and mixed in 10 minutes with stirring. After completion of the addition, stirring was continued for further 30 minutes. The melamine was 0.92 mol per mol of the total molar amount of the orthophosphoric acid content and the sulfuric acid content. The sulfuric acid content was 0.25 mol per mol of the orthophosphoric acid content. By the addition of this mixed aqueous solution comprising the aqueous orthophosphoric acid solution, concentrated sulfuric acid and water, remarkable heat generation took place, and steam was generated. The obtained wet powder-like reaction product was 1006 g.

Step (b)

500 g of the wet powder-like reaction product obtained in step (a) was put into a stainless steel vat, and baking was carried out at 340° C. in an electric furnace as baking of the first stage. The temperature raising time was such that the temperature became 340° C. in about 1 hour, and the baking temperature was maintained at 340° C. for 4 hours. Certain agglomeration takes place due to dehydration, and to prevent such agglomeration, when the temperature of the baked product became 340° C., it was taken out, and the agglomerated one was disintegrated, whereupon the baking was continued. By the baking, sublimation of melamine and formation of ammonia due to decomposition of melamine were observed. Further, as the second stage, the temperature was raised to 370° C. (temperature raising time: 15 minutes) and maintained at 370° C. for 3 hours. By the baking, sublimation of melamine and formation of ammonia due to decomposition of melamine were remarkably observed. Further, due to the baking, the surface became blackish due to a formed polyphosphoric acid, and the baked product adhered substantially to the stainless steel vat, and remarkable corrosion of the stainless steel vat took place, and with this blend composition, the production was not possible.

INDUSTRIAL APPLICABILITY

The baked products obtained by the present invention were confirmed to be 1,3,5-triazine derivative salts of polyacids comprising phosphorus, sulfur and oxygen and their mixtures, by the elemental analyses, the powder X-ray diffraction and the differential thermal analyses.

The 1,3,5-triazine derivative salts of polyacids comprising phosphorus, sulfur and oxygen and their mixtures, of the present invention, are excellent in heat resistance and water resistance and also excellent in the powder characteristics such as pulverizability, dispersibility and flowability. Further, such 1,3,5-triazine derivative salts and their mixtures have high dimelam temperatures, and the temperature for desorbing (volatilization) of phosphoric acid are lower than melamine polyphosphate. Accordingly, the baked products of the present invention will show very high flame retardancy when used alone or in combination with other phosphorus-type flame retardants.

1,3,5-triazine derivative salts of polyacids comprising phosphorus, sulfur and oxygen and their mixtures, according to the present invention, are useful as flame retardants for a wide range of resins including thermosetting resins such as phenol resins, epoxy resins, polyurethanes and unsaturated polyesters, thermoplastic resins such as polyamides, aromatic polyamides, polyethylene oxides, polycarbonates, polyolefins (such as polyethylene, polypropylene and polystyrene), polyphenylene ethers, modified polyphenylene ethers, rubber-modified styrene acrylonitrile-butadiene-styrene (ABS), polyesters, polysulfones, polybutylene terephthalates and polyvinyl chlorides, and their copolymers and alloys. Further, they are useful as flame retardants for e.g. molded products of these resins, resin-containing coating materials or adhesives, fibers and fiber products. The 1,3,5-triazine derivative salts of polyacids comprising phosphorus, sulfur and oxygen and their mixtures, according to the present invention, can be used in combination with those which are commonly used for the production of plastic materials, such as reinforcing agents, heat stabilizers, photo stabilizers, antioxidants, antistatic agents, pigments, fillers, lubricants, plasticizers or coupling agents for glass fibers, carbon fibers or potassium titanate whiskers. Further, the baked products of the present invention can be used in combination with other phosphorus type flame retardants, bromine type flame retardants or inorganic type flame retardants such as aluminum hydroxide or magnesium hydroxide.

Further, the 1,3,5-triazine derivative salts of polyacids comprising phosphorus, sulfur and oxygen and their mixtures, according to the present invention, can be used also as resin stabilizers in addition to flame retardants.

What is claimed is:

1. A 1,3,5-triazine derivative salt of a polyacid comprising phosphorus, sulfur and oxygen, which has a solubility of from 0.01 to 0.10 g/100 ml in water (25° C.) and a pH of from 2.0 to 7.0 as a 10 wt % aqueous slurry (25° C.), and which is obtained from the following steps (a) and (b):

(a) a step of obtaining a reaction product by mixing melamine, phosphoric acid and sulfuric acid at a temperature of from 0 to 330° C. in such ratios that the melamine is from 1.0 to 4.0 mols per mol of the total molar amount of the phosphoric acid (as calculated as orthophosphoric acid content) and the sulfuric acid (as sulfuric acid content), and the sulfuric acid (as sulfuric acid content) is from 0.05 to 20 mols per mol of the phosphoric acid (as calculated as orthophosphoric acid content), and (b) a step of baking the reaction product obtained in step (a) at a temperature of from 340 to 400° C. for from 0.1 to 30 hours.

2. A melamine•melam•melem double salt of a polyacid comprising phosphorus, sulfur and oxygen, according to claim 1, which has a solubility of from 0.01 to 0.10 g/100 ml in water (25° C.), a pH of from 2.5 to 4.5 as a 10 wt % aqueous slurry (25° C.), a sulfur atom content of 1 mol per mol of the phosphorus atom, and characteristic X-ray diffraction peaks at 2θ (±0.2°) of 6.1°, 10.3°, 19.0° and 28.6° in the powder X-ray diffraction (anticathode: Cu-Kα) and which is obtained from the following steps (a) and (b):

(a) a step of obtaining a reaction product by mixing melamine, phosphoric acid and sulfuric acid at a temperature of from 0 to 330° C. in such ratios that the melamine is from 2.0 to 4.0 mols per mol of the total molar amount of the phosphoric acid (as calculated as orthophosphoric acid content) and the sulfuric acid (as sulfuric acid content), and the sulfuric acid (as sulfuric acid content) is 1 mol per mol of the phosphoric acid (as calculated as orthophosphoric acid content), and (b) a step of baking the reaction product obtained in step (a) at a temperature of from 340 to 400° C. for from 0.1 to 30 hours.

3. A 1,3,5-triazine derivative salt mixture comprising a melamine•melam•melem double salt of a polyphosphoric acid and a melamine•melam•melem double salt of a polyacid comprising phosphorus, sulfur and oxygen, according to claim 1, which has a solubility of from 0.01 to 0.10 g/100 ml in water (25° C.), a pH of from 2.5 to 7.0 as a 10 wt % aqueous slurry (25° C.), and characteristic X-ray diffraction peaks at 2θ (±0.2°) of 6.1°, 8.2°, 10.3°, 14.8°, 18.2°, 19.0°, 26.7° and 28.6° in the powder X-ray diffraction (anticathode: Cu-Kα) and which is obtained from the following steps (a) and (b):

(a) a step of obtaining a reaction product by mixing melamine, phosphoric acid and sulfuric acid at a temperature of from 0 to 330° C. in such ratios that the melamine is from 2.0 to 4.0 mols per mol of the total molar amount of the phosphoric acid (as calculated as orthophosphoric acid content) and the sulfuric acid (as sulfuric acid content), and the sulfuric acid (as sulfuric acid content) is from 0.05 to 0.9 mol per mol of the phosphoric acid (as calculated as orthophosphoric acid content), and (b) a step of baking the reaction product obtained in step (a) at a temperature of from 340 to 400° C. for from 0.1 to 30 hours.

4. A 1,3,5-triazine derivative salt mixture comprising dimelam pyrosulfate and a melamine•melam•melem double salt of a polyacid comprising phosphorus, sulfur and oxygen, according to claim 1, which has a solubility of from 0.01 to 0.10 g/100 ml in water (25° C.), a pH of from 2.5 to 4.5 as a 10 wt % aqueous slurry (25° C.), and characteristic X-ray diffraction peaks at 2θ (±0.2°) of 6.1°, 10.3°, 10.6°, 19.0°, 19.5°, 21.3°, 27.3° and 28.6° in the powder X-ray diffraction (anticathode: Cu-Kα) and which is obtained from the following steps (a) and (b):

(a) a step of obtaining a reaction product by mixing melamine, phosphoric acid and sulfuric acid at a temperature of from 0 to 330° C. in such ratios that the melamine is from 2.0 to 4.0 mols per mol of the total molar amount of the phosphoric acid (as calculated as orthophosphoric acid content) and the sulfuric acid (as sulfuric acid content), and the sulfuric acid (as sulfuric acid content) is from 1.1 to 20 mol per mol of the phosphoric acid (as calculated as orthophosphoric acid content), and (b) a step of baking the reaction product obtained in step (a) at a temperature of from 340 to 400° C. for from 0.1 to 30 hours.

5. A melamine•melam•melem double salt of a polyacid comprising phosphorus, sulfur and oxygen, according to claim 1, which has a solubility of from 0.01 to 0.10 g/100 ml in water (25° C.), a pH of from 2.5 to 4.5 as a 10 wt % aqueous slurry (25° C.), and a dimelam pyrosulfate structure represented by characteristic X-ray diffraction peaks at 2θ (±0.2°) of 10.6°, 19.5°, 21.3° and 27.3° in the powder X-ray diffraction (anticathode: Cu-Kα) and which is obtained from the following steps (a) and (b):

(a) a step of obtaining a reaction product by mixing melamine, phosphoric acid and sulfuric acid at a temperature of from 0 to 330° C. in such ratios that the melamine is from 1.0 to 1.9 mols per mol of the total molar amount of the phosphoric acid (as calculated as orthophosphoric acid content) and the sulfuric acid (as sulfuric acid content), and the sulfuric acid (as sulfuric acid content) is from 1.0 to 20 mol per mol of the phosphoric acid (as calculated as orthophosphoric acid content), and (b) a step of baking the reaction product obtained in step (a) at a temperature of from 340 to 400° C. for from 0.1 to 30 hours.

6. A 1,3,5-triazine derivative salt mixture comprising dimelam pyrosulfate and a melamine•melam•melem double salt of a polyphosphoric acid, according to claim 1, which has a solubility of from 0.01 to 0.10 g/100 ml in water (25° C.), a pH of from 2.0 to 7.0 as a 10 wt % aqueous slurry (25° C.), and which is obtained from the following steps (a) and (b):

(a) a step of obtaining a reaction product by mixing melamine, phosphoric acid and sulfuric acid at a temperature of from 0 to 330° C. in such ratios that the melamine is from 1.0 to 1.9 mols per mol of the total molar amount of the phosphoric acid (as calculated as orthophosphoric acid content) and the sulfuric acid (as sulfuric acid content), and the sulfuric acid (as sulfuric acid content) is from 0.05 to 0.9 mol per mol of the phosphoric acid (as calculated as orthophosphoric acid content), and (b) a step of baking the reaction product obtained in step (a) at a temperature of from 340 to 400° C. for from 0.1 to 30 hours.

7. A process for producing a 1,3,5-triazine derivative salt of a polyacid comprising phosphorus, sulfur and oxygen, which has a solubility of from 0.01 to 0.10 g/100 ml in water (25° C.), and a pH of from 2.0 to 7.0 as a 10 wt % aqueous slurry (25° C.), which process comprises the following steps (a) and (b):

(a) a step of obtaining a reaction product by mixing melamine, phosphoric acid and sulfuric acid at a temperature of from 0 to 330° C. in such ratios that the melamine is from 1.0 to 4.0 mols per mol of the total molar amount of the phosphoric acid (as calculated as orthophosphoric acid content) and the sulfuric acid (as sulfuric acid content), and the sulfuric acid (as sulfuric acid content) is from 0.05 to 20 mol per mol of the phosphoric acid (as calculated as orthophosphoric acid content), and (b) a step of baking the reaction product obtained in step (a) at a temperature of from 340 to 400° C. for from 0.1 to 30 hours.

8. A process for producing a melamine•melam•melem double salt of a polyacid comprising phosphorus, sulfur and oxygen, which has a solubility of from 0.01 to 0.10 g/100 ml in water (25° C.), a pH of from 2.5 to 4.5 as a 10 wt % aqueous slurry (25° C.), a sulfur atom content of 1 mol per mol of the phosphorus atom, and characteristic X-ray diffraction peaks at 2θ (±0.2°) of 6.1°, 10.3°, 19.0° and 28.6° in the powder X-ray diffraction (anticathode: Cu-Kα), according to claim 7, which process comprises the following steps (a) and (b):

(a) a step of obtaining a reaction product by mixing melamine, phosphoric acid and sulfuric acid at a temperature of from 0 to 330° C. in such ratios that the melamine is from 2.0 to 4.0 mols per mol of the total molar amount of the phosphoric acid (as calculated as orthophosphoric acid content) and the sulfuric acid (as sulfuric acid content), and the sulfuric acid (as sulfuric acid content) is 1 mol per mol of the phosphoric acid (as calculated as orthophosphoric acid content), and (b) a step of baking the reaction product obtained in step (a) at a temperature of from 340 to 400° C. for from 0.1 to 30 hours.

9. A process for producing a 1,3,5-triazine derivative salt mixture comprising a melamine•melam•melem double salt of a polyphosphoric acid and a melamine•melam•melem double salt of a polyacid comprising phosphorus, sulfur and oxygen, which has a solubility of from 0.01 to 0.10 g/100 ml in water (25° C.), a pH of from 2.5 to 7.0 as a 10 wt % aqueous slurry (25° C.), and characteristic X-ray diffraction peaks at 2θ (±0.2°) of 6.1°, 8.2°, 10.3°, 14.8°, 18.2°, 19.0°, 26.7° and 28.6° in the powder X-ray diffraction (anticathode: Cu-Kα), according to claim 7, which process comprises the following steps (a) and (b):

(a) a step of obtaining a reaction product by mixing melamine, phosphoric acid and sulfuric acid at a temperature of from 0 to 330° C. in such ratios that the melamine is from 2.0 to 4.0 mols per mol of the total molar amount of the phosphoric acid (as calculated as orthophosphoric acid content) and the sulfuric acid (as sulfuric acid content), and the sulfuric acid (as sulfuric acid content) is from 0.05 to 0.9 mol per mol of the phosphoric acid (as calculated as orthophosphoric acid content), and (b) a step of baking the reaction product obtained in step (a) at a temperature of from 340 to 400° C. for from 0.1 to 30 hours.

10. A process for producing a 1,3,5-triazine derivative salt mixture comprising dimelam pyrosulfate and a melamine•melam•melem double salt of a polyacid comprising phosphorus, sulfur and oxygen, which has a solubility of from 0.01 to 0.10 g/100 ml in water (25° C.), a pH of from 2.5 to 4.5 as a 10 wt % aqueous slurry (25° C.), and characteristic X-ray diffraction peaks at 2θ (±0.2°) of 6.1°, 10.3°, 10.6°, 19.0°, 19.5°, 21.3°, 27.3° and 28.6° in the powder X-ray diffraction (anticathode: Cu-Kα), according to claim 7, which process comprises the following steps (a) and (b):

(a) a step of obtaining a reaction product by mixing melamine, phosphoric acid and sulfuric acid at a temperature of from 0 to 330° C. in such ratios that the melamine is from 2.0 to 4.0 mols per mol of the total molar amount of the phosphoric acid (as calculated as orthophosphoric acid content) and the sulfuric acid (as sulfuric acid content), and the sulfuric acid (as sulfuric acid content) is from 1.1 to 20 mol per mol of the phosphoric acid (as calculated as orthophosphoric acid content), and (b) a step of baking the reaction product obtained in step (a) at a temperature of from 340 to 400° C. for from 0.1 to 30 hours.

11. A process for producing a melamine•melam•melem double salt of a polyacid comprising phosphorus, sulfur and oxygen, which has a solubility of from 0.01 to 0.10 g/100 ml in water (25° C.), a pH of from 2.5 to 4.5 as a 10 wt % aqueous slurry (25° C.), and a dimelam pyrosulfate structure represented by characteristic X-ray diffraction peaks at 2θ (±0.2°) of 10.6°, 19.5°, 21.3° and 27.3° in the powder X-ray diffraction (anticathode: Cu-Kα), according to claim 7, which process comprises the following steps (a) and (b):

(a) a step of obtaining a reaction product by mixing melamine, phosphoric acid and sulfuric acid at a temperature of from 0 to 330° C. in such ratios that the melamine is from 1.0 to 1.9 mols per mol of the total molar amount of the phosphoric acid (as calculated as orthophosphoric acid content) and the sulfuric acid (as sulfuric acid content), and the sulfuric acid (as sulfuric acid content) is from 1.0 to 20 mol per mol of the phosphoric acid (as calculated as orthophosphoric acid content), and (b) a step of baking the reaction product obtained in step (a) at a temperature of from 340 to 400° C. for from 0.1 to 30 hours.

12. A process for producing a 1,3,5-triazine derivative salt mixture comprising dimelam pyrosulfate and a melamine polyphosphate•melam•melem double salt, which has a solubility of from 0.01 to 0.10 g/100 ml in water (25° C.), a pH of from 2.0 to 7.0 as a 10 wt % aqueous slurry (25° C.), according to claim 7, which comprises the following steps (a) and (b):

(a) a step of obtaining a reaction product by mixing melamine, phosphoric acid and sulfuric acid at a temperature of from 0 to 330° C. in such ratios that the melamine is from 1.0 to 1.9 mols per mol of the total molar amount of the phosphoric acid (as calculated as orthophosphoric acid content) and the sulfuric acid (as sulfuric acid content), and the sulfuric acid (as sulfuric acid content) is from 0.05 to 0.9 mol per mol of the phosphoric acid (as calculated as orthophosphoric acid content), and (b) a step of baking the reaction product obtained in step (a) at a temperature of from 340 to 400° C. for from 0.1 to 30 hours.

13. The process according to claim 7, wherein in step (a), the phosphoric acid is an aqueous orthophosphoric acid solution having an orthophosphoric acid concentration of at least 50 wt %, and the sulfuric acid is an aqueous sulfuric acid solution having a sulfuric acid concentration of at least 50 wt %.

14. The process according to claim 7, wherein in step (a), the mixing is carried out at a temperature of from 80 to 150° C.

* * * * *

UNITED STATES PATENT AND TRADEMARK OFFICE
CERTIFICATE OF CORRECTION

PATENT NO.    : 6,121,445
DATED         : September 19, 2000
INVENTOR(S)   : Keitaro Suzuki et al.

It is certified that error appears in the above-identified patent and that said Letters Patent is hereby corrected as shown below:

<u>Title page,</u>
Item [57], ABSTRACT,
"14 Claims, No Drawings" should read -- 14 Claims, 10 Drawing Sheets --.

<u>Drawings,</u>
Insert Drawings

<u>Column 4,</u>
Line 48, "—($O_3$HP—O—$SO_3$)" should read -- —($O_3$HP—O—$SO_3$)— --.

<u>Column 5,</u>
Line 20, "$C_3H6N_6$" should read -- $C_3H_6N_6$ --.

Figure 3:
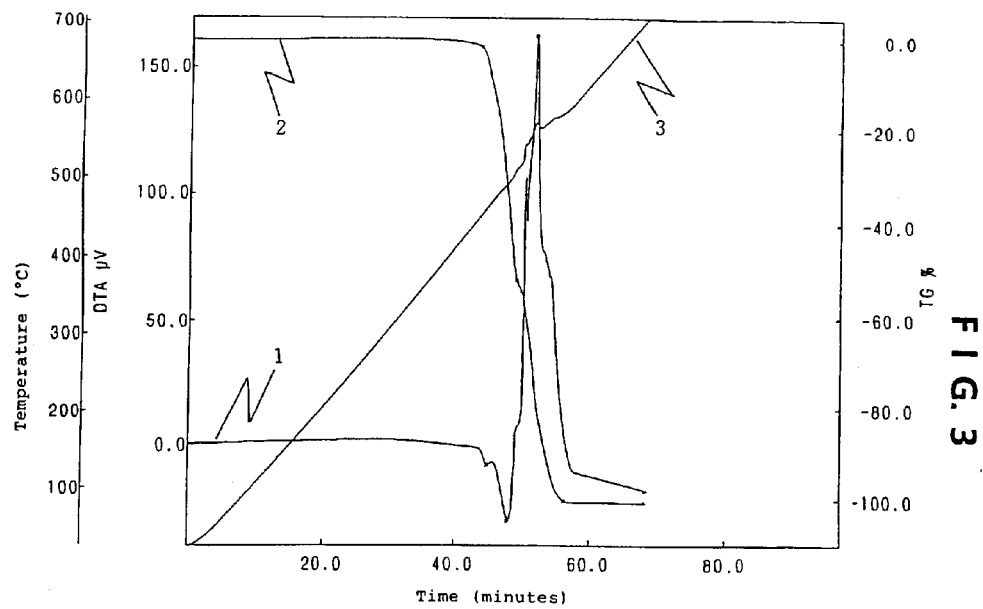
FIG. 3 is a graph of the differential thermal analysis of the dimelam pyrosulfate obtained in Reference Example 2.
Figure 4:
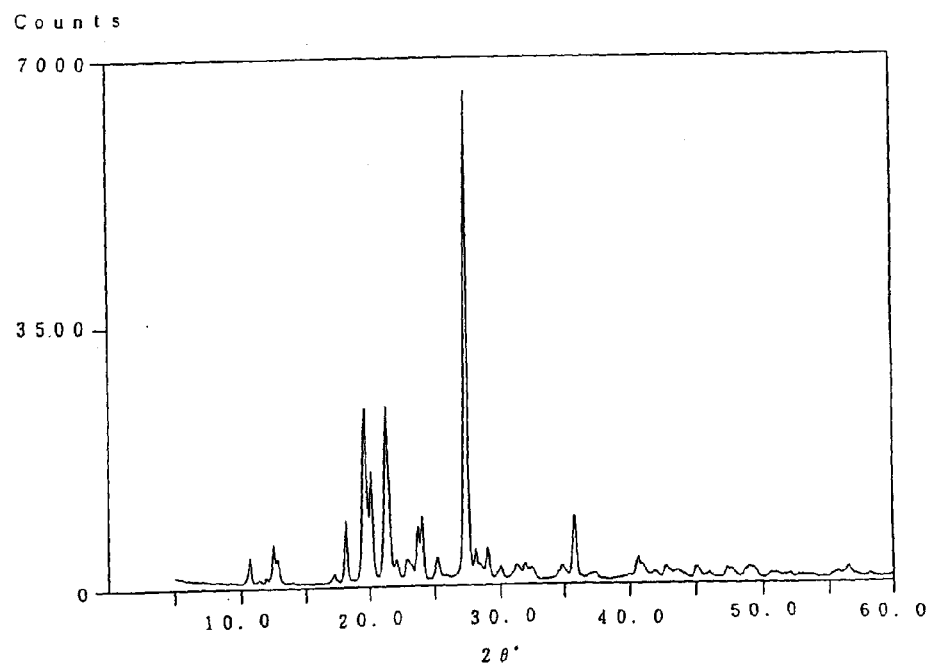
FIG. 4 is a powder X-ray diffraction pattern of the dimelam pyrosulfate obtained in Reference Example 2.
Figure 5:
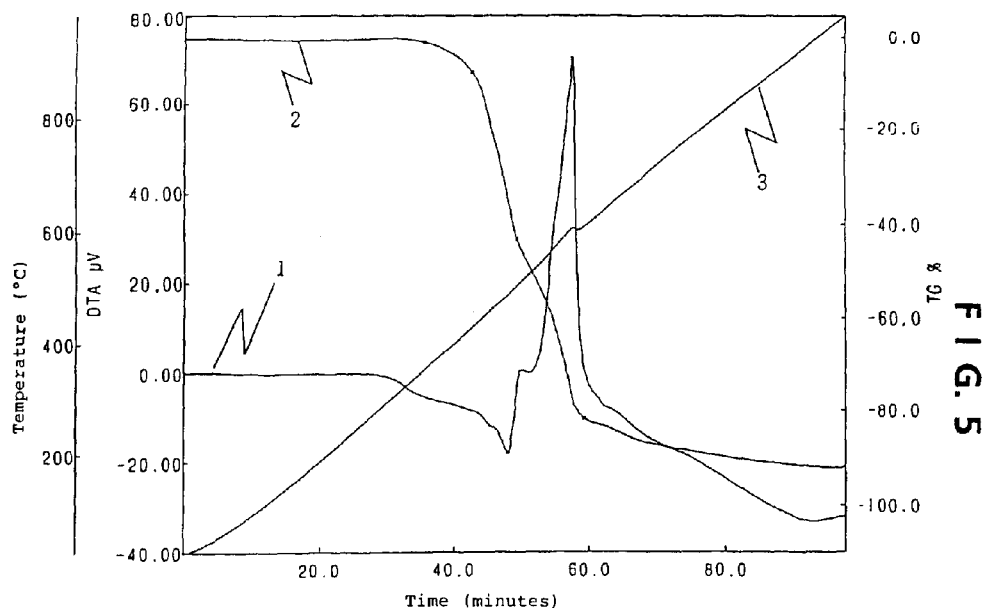
FIG. 5 is a graph of the differential thermal analysis of the melamine•melam•melem double salt of a polyacid comprising phosphorus, sulfur and oxygen, having a dimelam pyrosulfate structure, obtained in Example 2.
Figure 6:
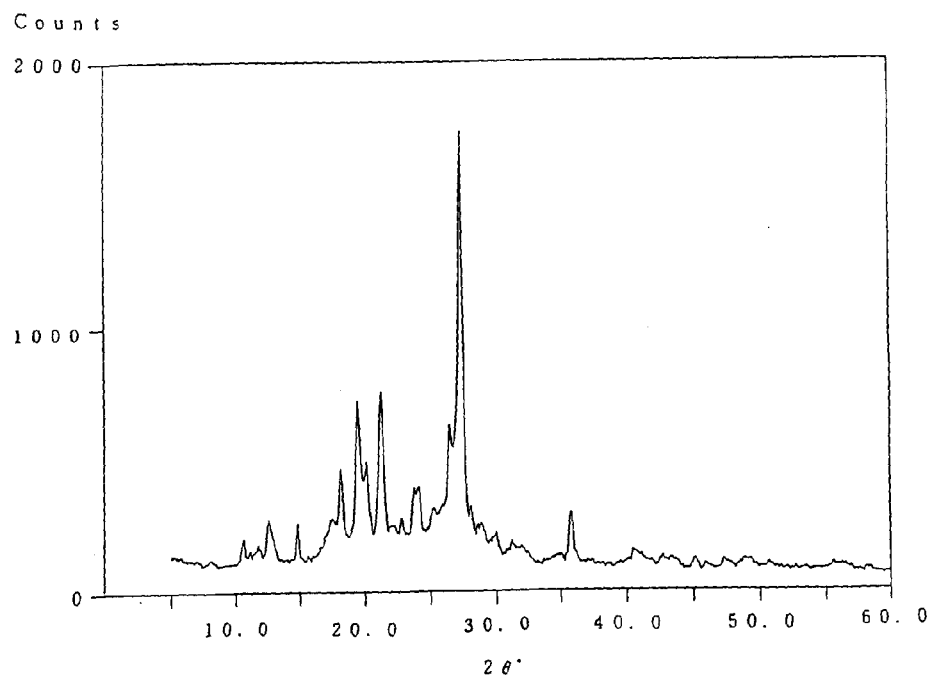
FIG. 6 is a powder X-ray diffraction pattern of the melamine•melam•melem double salt of a polyacid comprising phosphorus, sulfur and oxygen, having a dimelam pyrosulfate structure, obtained in Example 2.
Figure 7:
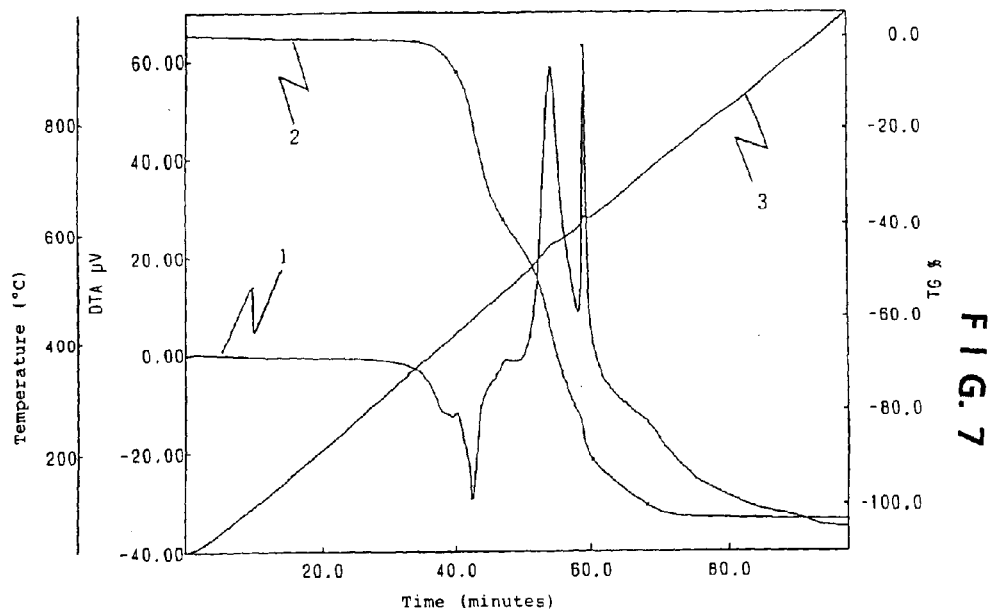
FIG. 7 is a graph of the differential thermal analysis of the melamine•melam•melem double salt comprising phosphorus, sulfur and oxygen [carbon atom/phosphorus atom/sulfur atom=14.1/1.04/1.00 (molar ratio)], obtained in Example 3.
Figure 8:
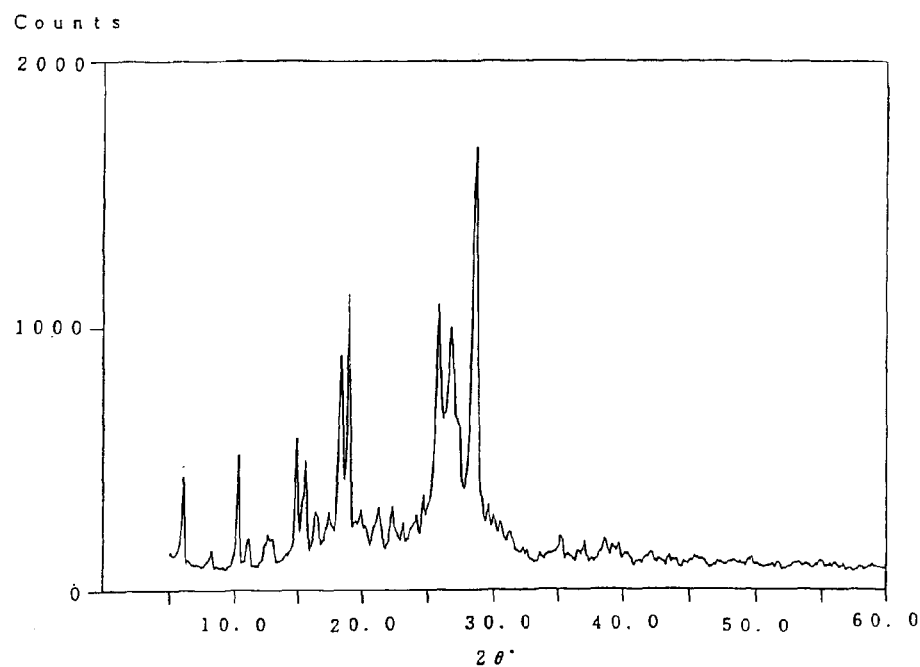
FIG. 8 is a powder X-ray diffraction pattern of the melamine•melam•melem double salt comprising phosphorus, sulfur and oxygen [carbon atom/phosphorus atom/sulfur atom=14.1/1.04/1.00 (molar ratio), obtained in Example 3.
Figure 9:
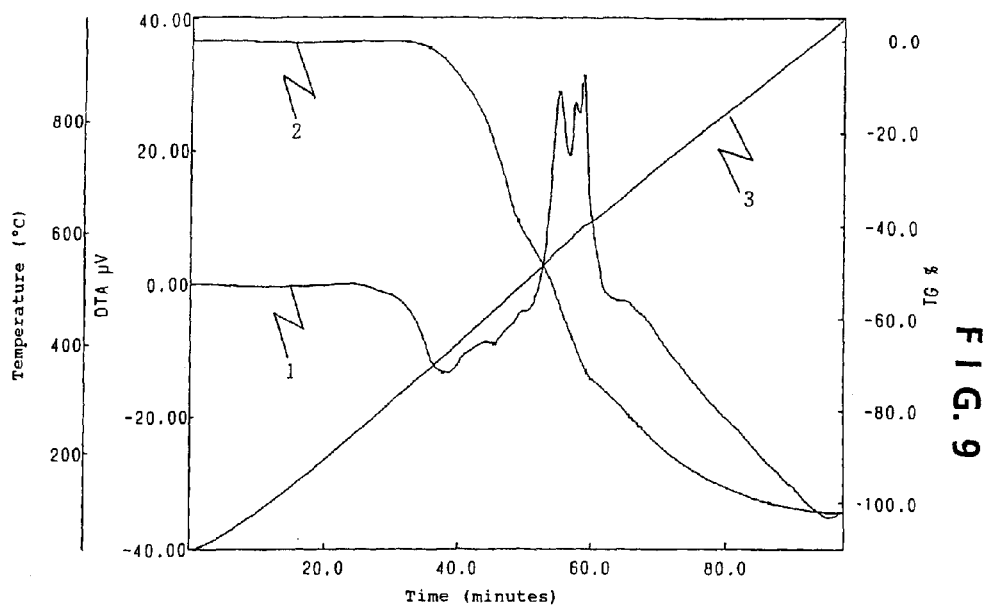
FIG. 9 is a graph of the differential thermal analysis of the 1,3,5-triazine derivative salt mixture comprising dimelam pyrosulfate and a melamine•melam•melem double salt of a polyphosphoric acid, obtained in Example 10.
Figure 10:
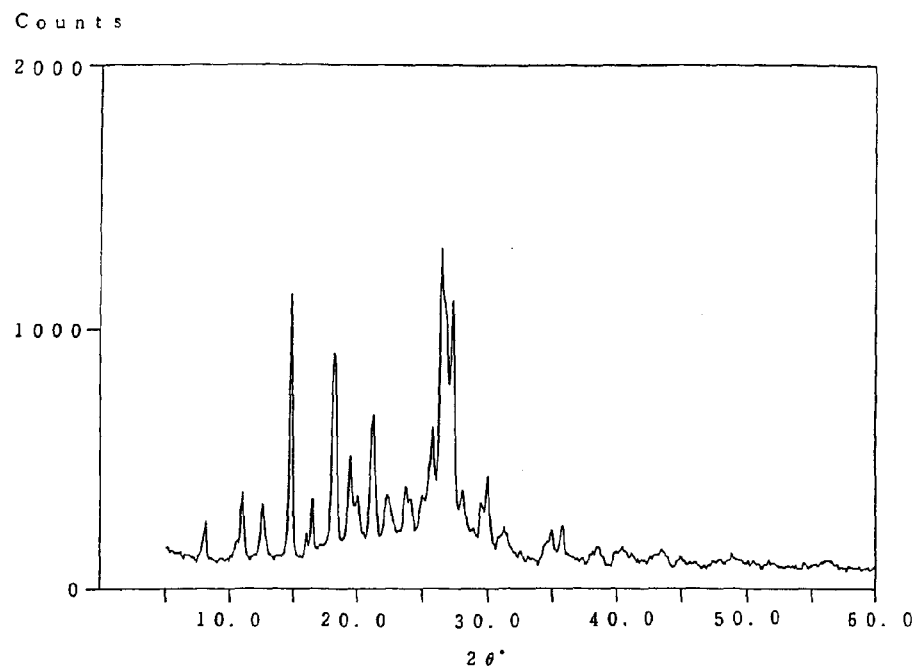
FIG. 10 is a powder X-ray diffraction pattern of the 1,3,5-triazine derivative salt mixture comprising dimelam pyrosulfate and a melamine•melam•melem double salt of a polyphosphoric acid, obtained in Example 10.

<u>Column 6,</u>
Line 9, "In FIGS. 1, 3,5,7 and 9," should read -- In FIGS. 1, 3, 5, 7 and 9, --.

Signed and Sealed this

Twenty-fifth Day of June, 2002

Attest:

*Attesting Officer*

JAMES E. ROGAN
*Director of the United States Patent and Trademark Office*